United States Patent
Rosewarne

(10) Patent No.: US 11,445,191 B2
(45) Date of Patent: Sep. 13, 2022

(54) METHOD, APPARATUS AND SYSTEM FOR ENCODING AND DECODING A TRANSFORMED BLOCK OF VIDEO SAMPLES

(71) Applicant: CANON KABUSHIKI KAISHA, Tokyo (JP)

(72) Inventor: Christopher James Rosewarne, Concord West (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/056,731

(22) PCT Filed: May 29, 2019

(86) PCT No.: PCT/AU2019/050534
§ 371 (c)(1),
(2) Date: Nov. 18, 2020

(87) PCT Pub. No.: WO2020/000019
PCT Pub. Date: Jan. 2, 2020

(65) Prior Publication Data
US 2021/0203933 A1    Jul. 1, 2021

(30) Foreign Application Priority Data

Jun. 29, 2018    (AU) ............................... 2018204786

(51) Int. Cl.
*H04N 19/12*    (2014.01)
*H04N 19/176*    (2014.01)
*H04N 19/60*    (2014.01)

(52) U.S. Cl.
CPC .......... *H04N 19/12* (2014.11); *H04N 19/176* (2014.11); *H04N 19/60* (2014.11)

(58) Field of Classification Search
CPC ....... H04N 19/12; H04N 19/60; H04N 19/176
See application file for complete search history.

(56) References Cited

U.S. PATENT DOCUMENTS

| 2004/0126021 A1 | 7/2004 | Sull et al. |
| 2005/0038837 A1 | 2/2005 | Marpe et al. |

(Continued)

FOREIGN PATENT DOCUMENTS

| CN | 104221383 A | 12/2014 |
| CN | 107835432 A | 3/2018 |

(Continued)

OTHER PUBLICATIONS

Saurabh Puri, CNN-Based Transform Index Prediction in Multiple Transforms Framework to Assist Entropy Coding, 2017 25th European Signal Processing Conference (EUSIPCO), Aug. 28, 2017, pp. 828-832.

(Continued)

*Primary Examiner* — Nam D Pham
(74) *Attorney, Agent, or Firm* — Canon U.S.A., Inc. IP Division

(57) ABSTRACT

The present disclosure provides a method 1200 of decoding a transform block in an image frame from a bitstream. The method comprises decoding a single truncated unary binarisation from the bitstream, the single truncated unary binarisation being used for a horizontal transform and a vertical transform of a transform block of the image frame. The method then determines a type of the horizontal and vertical transform based on the decoded single truncated unary binarisation and decodes the transform block in the image frame by applying the determined type of horizontal and vertical transform to the transform block of the image.

16 Claims, 15 Drawing Sheets

(56) References Cited

U.S. PATENT DOCUMENTS

| | | | |
|---|---|---|---|
| 2014/0056361 A1 | 2/2014 | Karczewicz et al. | |
| 2018/0020218 A1* | 1/2018 | Zhao | H04N 19/12 |
| 2018/0103252 A1 | 4/2018 | Hsieh et al. | |
| 2019/0373261 A1* | 12/2019 | Egilmez | H04N 19/46 |

FOREIGN PATENT DOCUMENTS

| | | |
|---|---|---|
| KR | 10-2018-0001485 A | 1/2018 |
| KR | 10-2018-0007680 A | 1/2018 |
| RU | 2563681 C2 | 9/2015 |
| WO | 2016/082774 A1 | 6/2016 |
| WO | 2017/075810 A1 | 5/2017 |
| WO | 2017/222334 A1 | 12/2017 |
| WO | 2018/011345 A1 | 1/2018 |

OTHER PUBLICATIONS

Jianle Chen, et al., JVET-G1001: Algorithm description of Joint Exploration Test Model 7 (JEM7), JVET Exploration Team of ITU-T SG 16 WP3 and ISO/IEC JTC 1/SC 29/WG11 JVET, 7th Meeting, Torino, Italy, Jul. 13-21, 2017, 50 pages, Doc. No. JVEI-G1001-v1.

Heiko Schwarz, et al., Description of Core Experiment 7 (CE 7): Quantization and coefficient coding, Joint Video Experts Team (JVET) of ITU-T SG 16 WP 3 and ISO/IEC JTC 1/SC 29/WG 11, 10th Meeting: San Diego, US, Apr. 10-20, 2018, Doc. No. JVET-J1027-V4.

Yi-Wen Chen, et al., Description of SDR, HDR and 360° video coding technology proposal by Qualcomm and Technicolor—low and high complexity versions, Joint Video Experts Team (JVET) of ITU-T SG 16 WP 3 and ISO/IEC JTC 1/SC 29/WG 11, 10th Meeting: San Diego, US, Apr. 10-20, 2018, Doc. No. JVET-J0021.

* cited by examiner

880

| Intra mode | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 |
| H | 2 | 1 | 0 | 1 | 0 | 1 | 0 | 1 | 0 | 1 | 0 | 1 | 0 | 1 | 2 |

| Intra mode | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|
| V | 0 | 0 | 0 | 0 | 0 | 0 | 0 | 0 | 1 | 0 | 1 | 0 | 1 | 0 | 1 |
| H | 2 | 2 | 2 | 2 | 2 | 2 | 2 | 2 | 1 | 0 | 1 | 0 | 1 | 0 | 1 |

| Intra mode | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|
| V | 0 | 1 | 0 | 1 | 0 | 1 | 0 | 1 | 0 | 1 | 0 | 1 | 0 | 1 | 0 |
| H | 0 | 1 | 0 | 1 | 0 | 1 | 0 | 1 | 0 | 1 | 0 | 1 | 0 | 1 | 0 |

| Intra mode | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|
| V | 1 | 2 | 2 | 2 | 2 | 2 | 2 | 2 | 2 | 2 | 1 | 0 | 1 | 0 | 1 |
| H | 1 | 0 | 0 | 0 | 0 | 0 | 0 | 0 | 0 | 0 | 1 | 0 | 1 | 0 | 1 |

| Intra mode | 60 | 61 | 62 | 63 | 64 | 65 | 66 |
|---|---|---|---|---|---|---|---|
| V | 0 | 1 | 0 | 1 | 0 | 1 | 0 |
| H | 0 | 1 | 0 | 1 | 0 | 1 | 0 |

Fig. 8C

METHOD, APPARATUS AND SYSTEM FOR ENCODING AND DECODING A TRANSFORMED BLOCK OF VIDEO SAMPLES

CROSS-REFERENCE TO RELATED APPLICATIONS

This application is the National Phase application of PCT Application No. PCT/AU2019/050534, filed on May 29, 2019 and titled "METHOD, APPARATUS AND SYSTEM FOR ENCODING AND DECODING A TRANSFORMED BLOCK OF VIDEO SAMPLES". This application claims the benefit under 35 U.S.C. § 119(a)-(d) of Australian Patent Application No. 2018204786, filed on Jun. 29, 2018. The above cited patent applications are incorporated by reference herein in their entireties.

TECHNICAL FIELD

The present invention relates generally to digital video signal processing and, in particular, to a method, apparatus and system for encoding and decoding a transformed block of video samples. The present invention also relates to a computer program product including a computer readable medium having recorded thereon a computer program for encoding and decoding a transformed block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), known as the "Video Coding Experts Group" (VCEG), and members of the International Organisations for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. At the same time, VVC must be implementable in contemporary silicon processes and offer an acceptable trade-off between the achieved performance versus the implementation cost (for example, in terms of silicon area, CPU processor load, memory utilisation and bandwidth).

Video data includes a sequence of frames of image data, each of which include one or more colour channels. Generally there is one primary colour channel and two secondary colour channels. The primary colour channel is generally referred to as the 'luma' channel and the secondary colour channel(s) are generally referred to as the 'chroma' channels. Although video data is typically displayed in an RGB (red-green-blue) colour space, the colour space has a high degree of correlation between the three respective components. The video data representation seen by an encoder or a decoder is often using a colour space such as YCbCr. YCbCr concentrates luma in a Y (primary) channel and chroma in Cb and Cr (secondary) channels. Moreover, the Cb and Cr channels may be sampled at a lower rate compared to the luma channel, for example half horizontally and half vertically—known as a '4:2:0 chroma format'.

VVC is a 'block based' codec, in which frames are divided into blocks and the blocks are processed in a particular order. For each block a prediction of the contents of the block is generated and a representation of the difference (or 'residual' in the spatial domain) between the prediction and the actual block contents seen as input to the encoder is formed. The difference may be coded as a sequence of residual coefficients, resulting from the application of the forward primary transform, such as a Discrete Cosine Transform (DCT) or other transform, to the block of residual values. This primary transform is applied to a block of residual samples separably, i.e. the two dimensional transform is performed in two passes, with firstly the rows being transformed by applying a one-dimensional transform to each row and, then transforming this result by applying a one-dimensional transform to each column to produce a block of residual coefficients that substantially decorrelates the residual samples. Moreover, multiple transforms are available for use in this row and column processing, requiring signalling to indicate which one is to be used. Although the option to use different transforms in the block affords a compression advantage, this is slightly reduced by the need to code indices to select which transform is to be used horizontally and vertically. Efficient coding of this signalling is beneficial to impact of this signalling overhead.

SUMMARY

It is an object of the present invention to substantially overcome, or at least ameliorate, one or more disadvantages of existing arrangements.

An aspect of the present disclosure provides a method of decoding a transform block in an image frame, from a bitstream, the method comprising: decoding a single truncated unary binarisation from the bitstream, the single truncated unary binarisation being used for a horizontal transform and a vertical transform of a transform block of the image frame; determining a type of the horizontal and vertical transform based on the decoded single truncated unary binarisation; and decoding the transform block in the image frame by applying the determined type of horizontal and vertical transform to the transform block of the image.

Another aspect of the present disclosure provides a non-transitory computer readable medium comprising computer application programs, the programs being executable by a computer apparatus to make the computer perform a method of decoding a transform block in an image frame, from a bitstream, the method comprising: decoding a single truncated unary binarisation from the bitstream, the single truncated unary binarisation being used for a horizontal transform and a vertical transform of a transform block of the image frame; determining a type of the horizontal and vertical transform based on the decoded single truncated unary binarisation; and decoding the transform block in the image frame by applying the determined type of horizontal and vertical transform to the transform block of the image.

Other aspects are also disclosed.

BRIEF DESCRIPTION OF THE DRAWINGS

At least one embodiment of the present invention will now be described with reference to the following drawings and and appendices, in which:

FIG. 8C is a table showing a mapping from intra prediction modes to transform sets for a transform block in a horizontal direction and a vertical direction;

DETAILED DESCRIPTION INCLUDING BEST MODE

Figure 1:
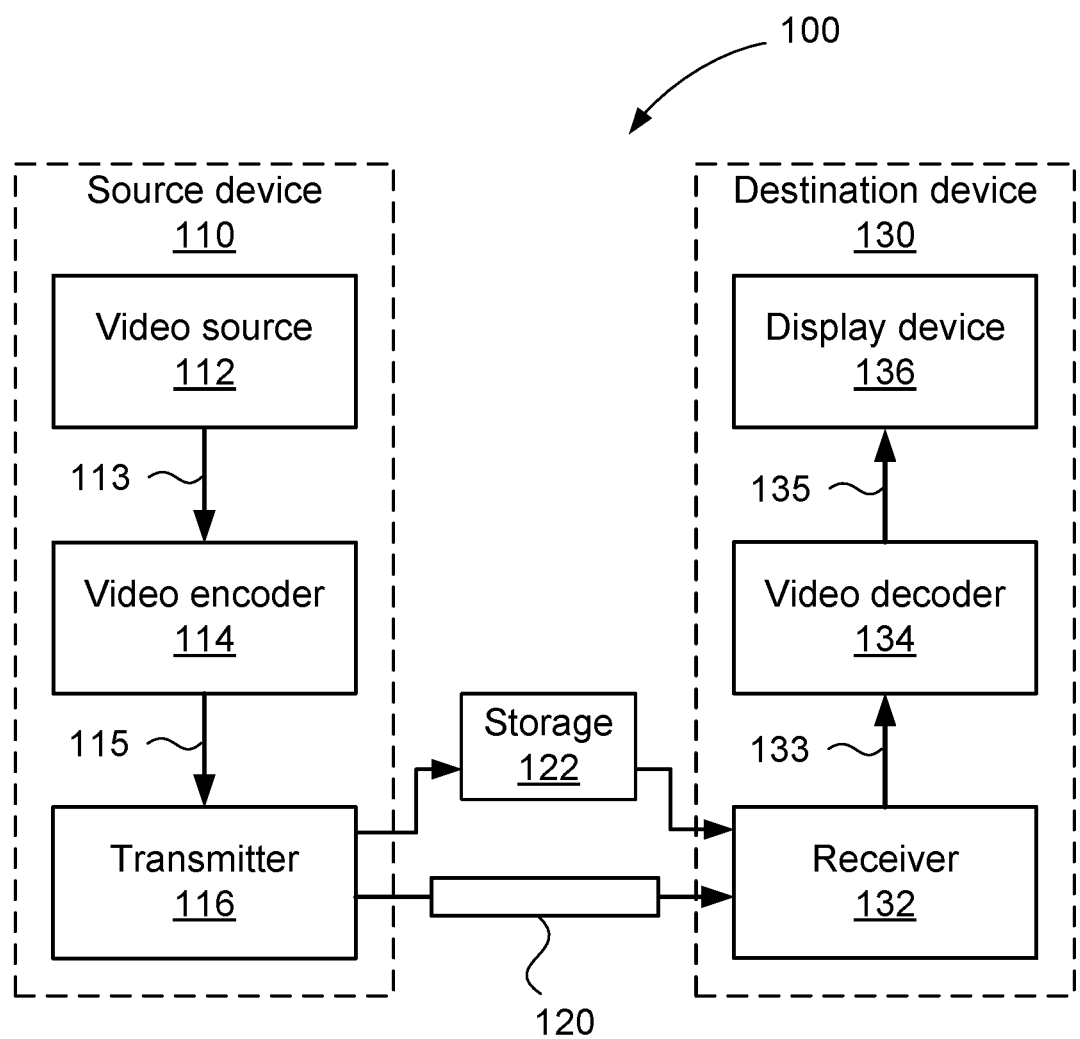
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram showing function modules of a video encoding and decoding system 100. The system 100 may utilise coefficient scanning methods to improve compression efficiency and/or achieve reduced implementation cost. The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an imaging sensor, a previously captured video sequence stored on a non-transitory recording medium, or a video feed from a remote imaging sensor. The video source 112 may also be the output of a computer graphics card, e.g. displaying the video output of an operating system and various applications executing upon a computing device, for example a tablet computer. Examples of source devices 110 that may include an imaging sensor as the video source 112 include smartphones, video camcorders, professional video cameras, and network video cameras. The video encoder 114 converts (or 'encodes') the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or "encoded video information"). It is also possible for the bitstream 115 to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data) indicated by an arrow 135) to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers.

Figure 2A:
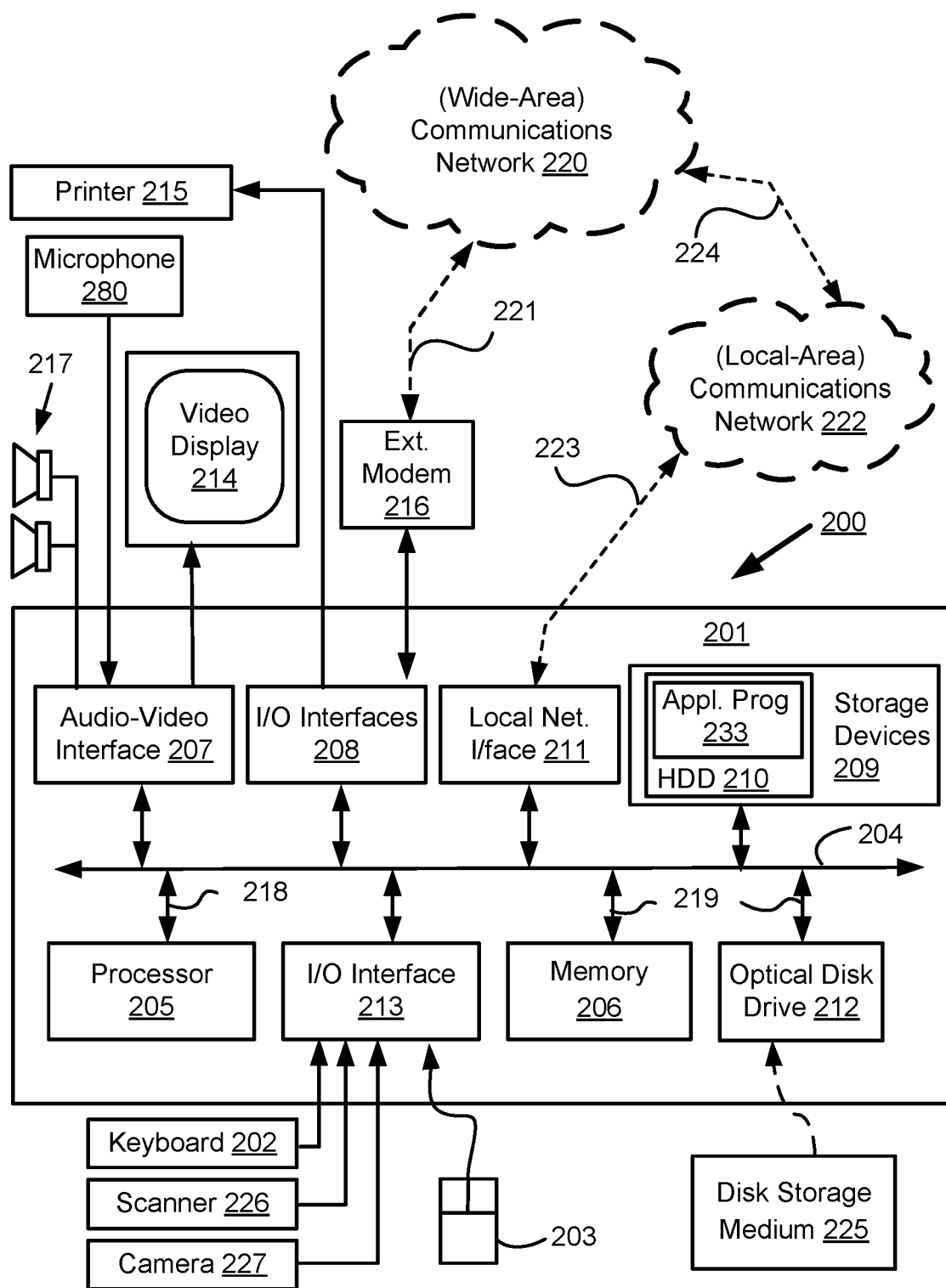
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
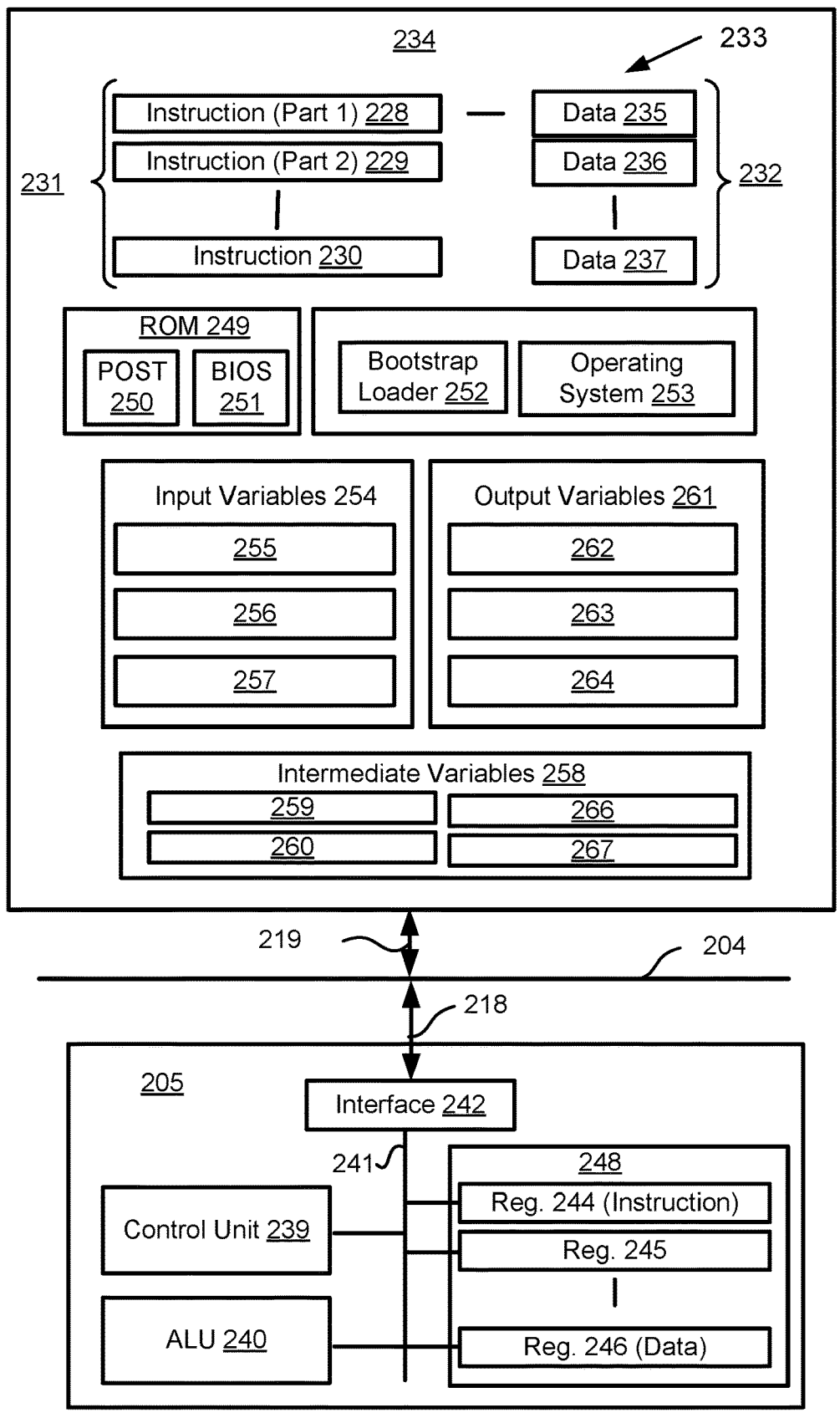

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 12:
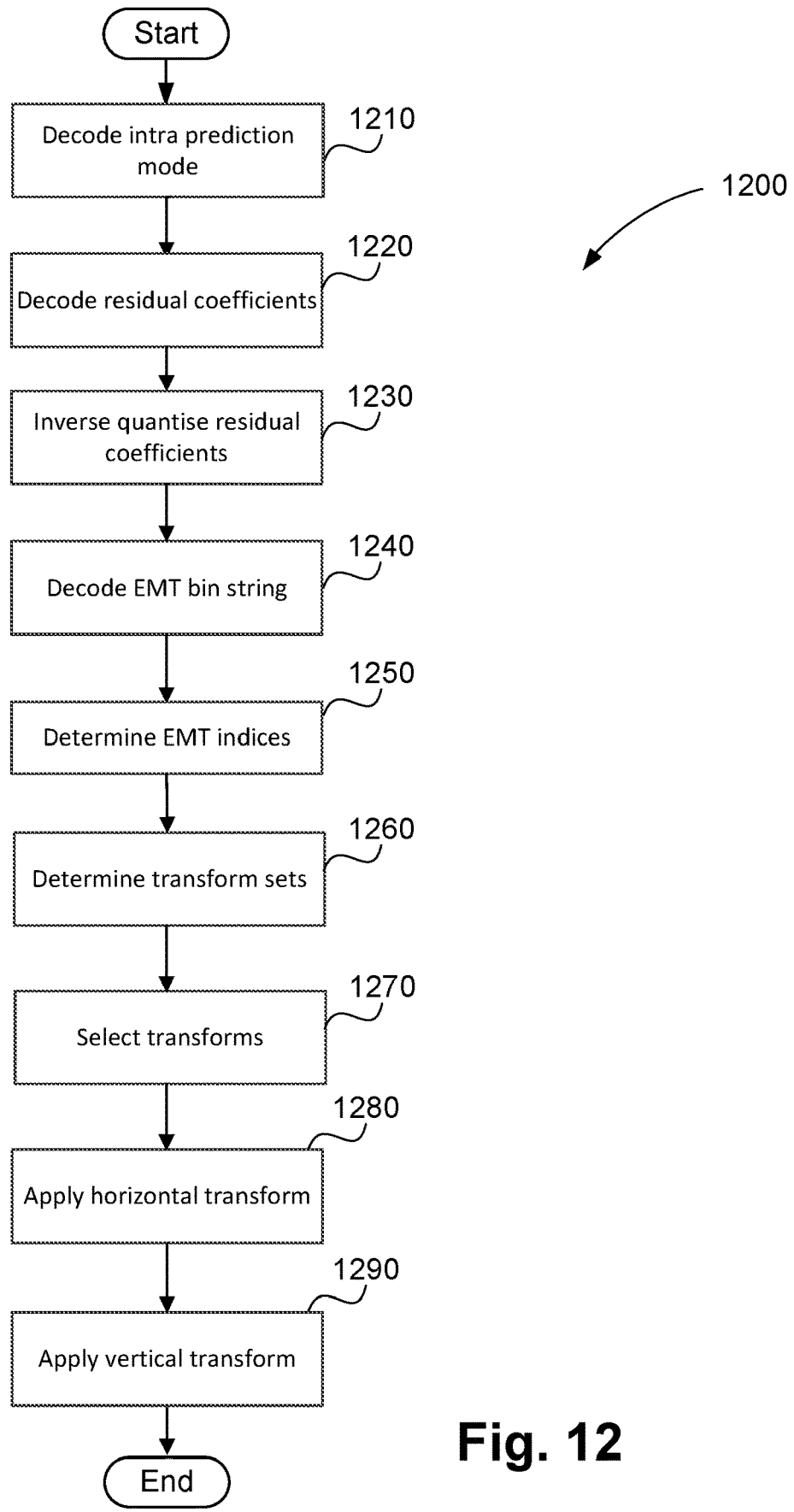
FIG. 12 is a flow chart diagram of a method of decoding a transform block of residual coefficients from a bitstream by a primary inverse transform according to an explicit transform selection.

Each step or sub-process in the method of FIGS. 12 and 13, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
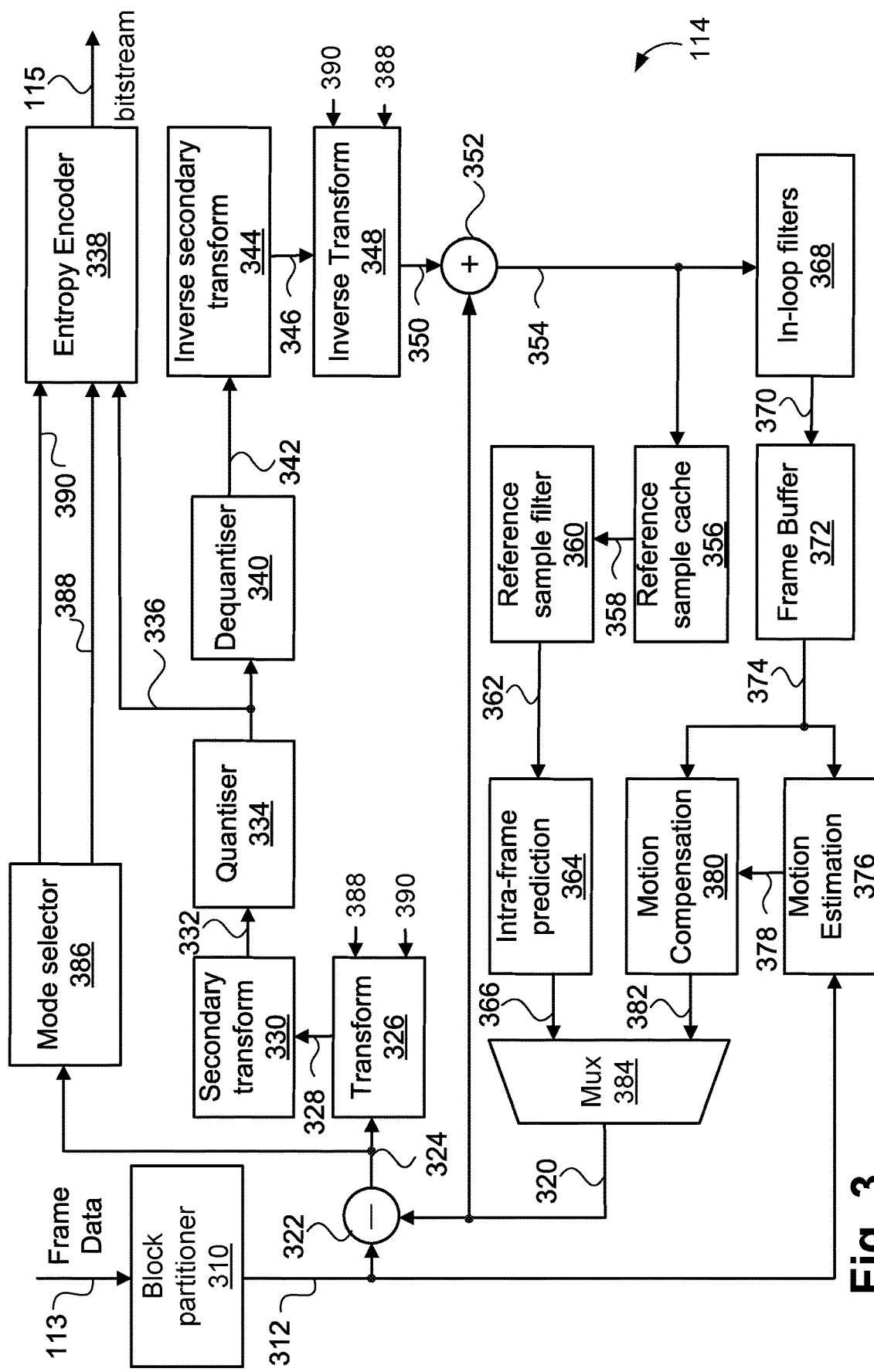
FIG. 3 is a schematic block diagram showing functional modules of a video encoder.
Figure 4:
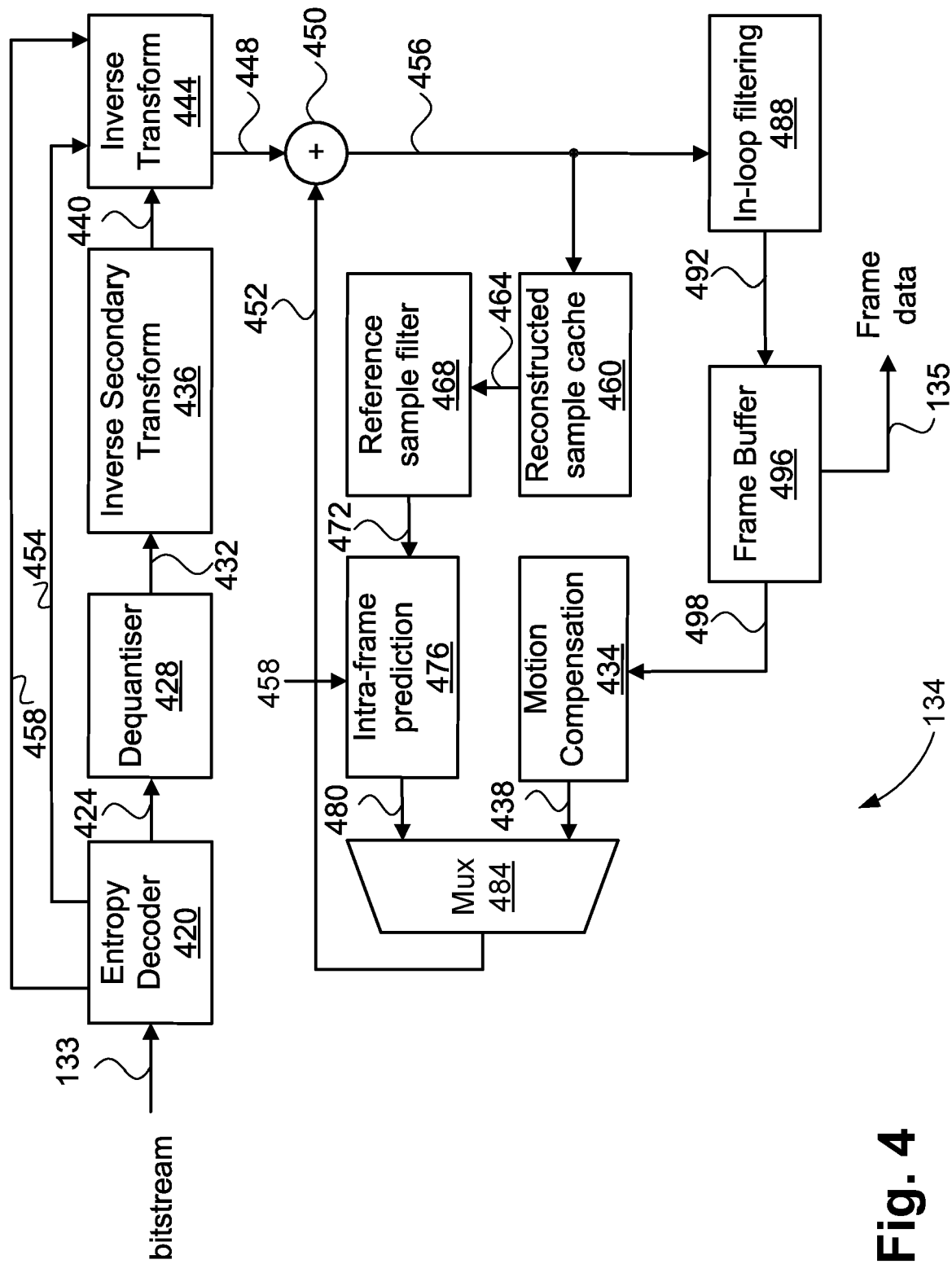
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 322-386 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. A block partitioner 310 firstly divides the frame data 113 into regions generally referred to as 'coding tree units' (CTUs), generally square in shape and configured such that a particular size for the CTUs is used. The size of the coding tree units may be 64×64, 128×128, or 256×256 luma samples for example. The block partitioner 310 further divides each CTU into one or more coding units (CUs), with the CUs having a variety of sizes, which may include both square and non-square aspect ratios. Thus, a current block 312, 'coding unit' (CU), is output from the block partitioner 310, progressing in accordance with an iteration over the one or more blocks of the CTU. However, the concept of a CU is not limited to the block partitioning resulting from the block partitioner 310. The video decoder 134 may also be said to produce CUs which, due to use of lossy compression techniques, are typically an approximation of the blocks from the block partitioner 310. Moreover, the video encoder 114 produces CUs having the same approximation as seen in the video decoder 134, enabling exact knowledge of the sample data available to block prediction methods in the video decoder 134. The options for partitioning CTUs into CUs are further described below with reference to FIGS. 5 and 6.

The coding tree units (CTUs) resulting from the first division of the frame data 113 may be scanned in raster scan order and are grouped into one or more 'slices'. As the frame data 113 typically includes multiple colour channels, the CTUs and CUs are associated with the samples from all colour channels that overlap with the block area defined from operation of the block partitioner 310. A CU may be said to comprise one or more coding blocks (CBs), with each CB occupying the same block area as the CU but being associated with each one of the colour channels of the frame data 113. Due to the potentially differing sampling rate of the chroma channels compared to the luma channel, the dimensions of CBs for chroma channels may differ from those of CBs for luma channels. When using the 4:2:0 chroma format, CBs of chroma channels of a CU have dimensions of half of the width and height of the CB for the luma channel of the CU.

In iterating over all CUs resulting from the block partitioner 310, the video encoder 114 produces a 'prediction unit' (PU), indicated by an arrow 320, for each block, for example the block 312. The PU 320 is a prediction of the contents of the associated CU 312. A subtracter module 322 produces a difference, indicated as 324 (or 'residual', referring to the difference being in the spatial domain), between the PU 320 and the CU 312. The difference 324 is a block-size difference between corresponding samples in the PU 320 and the CU 312. The difference 324 is transformed, quantised and represented as a transform unit (TU), indicated by an arrow 336. The PU 320 is typically chosen as the 'best' resulting one of many possible candidate PUs. A candidate PU is a PU resulting from one of the prediction modes available to the video encoder 114. Each candidate PU results in a corresponding transform unit. The transform unit 336 is a quantised and transformed representation of the difference 324. When combined with the predicted PU in the decoder 114, the transform unit 336 reduces the difference between decoded CUs and the original blocks 312 at the expense of additional signalling in a bitstream.

Each candidate PU thus has an associated coding cost (rate) and an associated difference (or 'distortion'). The coding rate (cost) is typically measured in bits. the coding distortion of a block is typically estimated as a difference in sample values, such as a sum of absolute differences (SAD) or a sum of squared differences (SSD). The estimate resulting from each candidate PU is determined by a mode selector 386 using the difference 324 to determine an intra prediction mode (represented by an arrow 388). Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense.

Determining an optimum mode is typically achieved using a variation of Lagrangian optimisation. Selection of the intra prediction mode 388 typically involves determining a coding cost for the residual data resulting from application of a particular intra prediction mode. The coding cost may be approximated by using a 'sum of transformed differences' whereby a relatively simple transform, such as a Hadamard transform, is used to obtain an estimated transformed residual cost. For implementations using relatively simple transforms, provided the costs resulting from the simplified estimation method are monotonically related to the actual costs that would otherwise be determined from a full evaluation, the simplified estimation method may be used to make the same decision (i.e. intra prediction mode) with a reduction in complexity in the video encoder 114. To allow for possible non-monotonicity in the relationship between estimated and actual costs, possibly resulting from further mode decisions available for the coding of residual data, the simplified estimation method may be used to generate a list of best candidates. The list of best candidates may be of an arbitrary number. A more complete search may be performed using the best candidates to establish optimal mode choices for coding the residual data for each of the candidates, allowing a final selection of the intra prediction mode along with other mode decisions.

The other mode decisions include an ability to skip the primary and secondary transforms, known as 'transform skip'. Skipping the transforms is suited to residual data that lacks adequate correlation for reduced coding cost via expression as transform basis functions. Certain types of content, such as relatively simple computer generated graphics may exhibit similar behaviour.

Another mode decision associated with the mode selector module 386 is selection of an explicit multiple transform index (represented by an arrow 390). The explicit multiple transform index 390 has four possible values. These four possible values are the combination of two indices (shown in columns 1046 and 1048 in FIG. 10A), where each index is in the range of zero to one. The first index relates to a horizontal transform index H and the second index relates to a vertical transform index V. The horizontal transform index H is also known as the horizontal transform selection and the vertical transform index V is known as the vertical transform selection. Selection and coding of the explicit multiple transform index 390 is described with reference to FIG. 10.

Lagrangian or similar optimisation processing can be employed to both select an optimal partitioning of a CTU into CUs (by the block partitioner 310) as well as the selection of a best prediction mode from a plurality of possibilities. Through application of a Lagrangian optimisation process of the candidate modes in a mode selector module 386, the intra prediction mode with the lowest cost measurement is selected as the best mode. The best mode is the selected intra prediction mode 388 and is also encoded in the bitstream 115 by an entropy encoder 338. The selection of the intra prediction mode 388 by operation of the mode selector module 386 extends to operation of the block partitioner 310. For example, candidates for selection of the intra prediction mode 388 may include modes applicable to a given block and additionally modes applicable to multiple smaller blocks that collectively are collocated with the given block. In such cases, the process of selection of candidates implicitly is also a process of determining the best hierarchical decomposition of the CTU into CUs.

The entropy encoder 338 supports both variable-length coding of syntax elements and arithmetic coding of syntax elements. Arithmetic coding is supported using a context-adaptive binary arithmetic coding process. Arithmetically coded syntax elements consist of sequences of one or more 'bins'. Bins, like bits, have a value of '0' or '1'. However bins are not encoded in the bitstream 115 as discrete bits. Bins have an associated likely value and an associated probability, known as a 'context'. When the actual bin to be coded matches the likely value, a 'most probable symbol' (MPS) is coded. Coding a most probable symbol is relatively inexpensive in terms of consumed bits. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (i.e., a 'flag'), a single bin is adequate. For syntax elements with many possible values, a sequence of bins is needed. Then, the presence of later bins in the sequence may be determined based on the value of earlier bins in the sequence. Additionally, each bin may be associated with more than one context, with the selection of a particular context dependent on earlier bins in the syntax element, the bin values of neighbouring syntax elements (i.e. those from neighbouring blocks) and the like. Each time a bin is coded, the context is updated to adapt to the new bin value. As such, the binary arithmetic coding scheme is said to be adaptive.

Also supported by the encoder 114 are bins that lack a context ('bypass bins'). Bypass bins are coded assuming an equiprobable distribution between a '0' and a '1'. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes the intra prediction mode 388 using a combination of context-coded and (optionally) bypass-coded bins. Typically, a list of 'most probable modes' is generated in the video encoder 114. The list of most probable modes is typically of a fixed length, such as three or six modes, and may include modes encountered in earlier blocks. A context-coded bin encodes a flag indicating if the intra prediction mode is one of the most probable modes. If the intra prediction mode 388 is one of the most probable modes, further signalling is encoded indicative of which most probable mode corresponds with the intra prediction mode 388, for example using a truncated unary bin string. Otherwise, the intra prediction mode 388 is encoded as a 'remaining mode', using an alternative syntax, such as a fixed-length code, to express intra prediction modes other than those present in the most probable mode list.

The entropy encoder 338 also encodes the explicit multiple transform index 390 for particular coding units or transform blocks, as described with reference to FIG. 10. In particular, the explicit multiple transform index 390 includes a vertical transform index V and a horizontal transform index H. Both the vertical transform index V and the horizontal transform index H are selected by the mode selector 386 (as described above). Based on the combination of the vertical transform index V and the horizontal transform index H (see FIG. 10A), the entropy encoder 338 encodes the corresponding bin string (shown in column 1042 in FIG. 10A) into the bitstream 115.

A multiplexer module 384 outputs the PU 320 according to the determined best intra prediction mode 388, selecting from the tested candidate prediction modes. The candidate prediction modes need not include every conceivable prediction mode supported by the video encoder 114. Prediction modes fall broadly into two categories. A first category is 'intra-frame prediction' (or 'intra prediction'). In intra-frame prediction a prediction for a block is produced using other samples drawn from the current frame. The second category is 'inter-frame prediction' (or 'inter prediction'). In intra-frame prediction a prediction for a block is produced using samples from a frame preceding the current frame in the order of coding frames in the bitstream (which may differ from the order of the frames when captured or displayed). Within each category (i.e. intra- and inter-prediction), different techniques may be applied to generate the PU. For example, intra-prediction may use values from adjacent rows and columns of previously reconstructed samples, in combination with a direction to generate a PU according to a prescribed filtering process. Alternatively, the PU may be described using a small number of parameters. Inter-prediction methods may vary in the number of motion parameters and their precision. Motion parameters typically comprise a reference frame offset plus a translation for one or two reference frames, but may include more frames, special frames, or complex affine parameters such as scaling and rotation. In addition, a pre-determined motion refinement process may be applied to generate dense motion estimates based on referenced sample blocks.

Having determined and selected a best PU 320, and subtracted the PU 320 from the original sample block at the subtractor 322, a residual with lowest coding cost 324 is obtained and subjected to lossy compression. The lossy compression process comprises the steps of transformation, quantisation and entropy coding. A transform module 326 applies a first transform to the difference 324, converting the difference 324 to the frequency domain, and producing intermediate transform coefficients represented by an arrow 328. The first transform is typically separable, transforming a set of rows and then a set of columns of each block. The transformation of each set of rows and columns is performed by applying repeated one-dimensional transforms in each row and column of the block. The transformation spans the whole block.

In particular, the intra prediction mode 388 and the explicit multiple transform index 390 are used to select a horizontal one-dimensional transform and a vertical one-dimensional transform, which collectively form the primary transform performed by the transform module 326. Each of the horizontal one-dimensional transform and the vertical one-dimensional transform is a separable transform. The horizontal one-dimensional transform and the vertical one-dimensional transform are performed over the entire transform block, substantially decorrelating the residual samples.

The available transform types for the transform module 326 include the DST-VII, DST-VIII, DCT-VIII, DST-I, and the DCT-V. From this set of transforms, three 'transform sets' 842 are defined, as described with reference to FIG. 8B. For each direction in either the horizontal or vertical direction, a transform set 842 is selected according to the intra prediction mode 388, as described with reference to FIG. 8C. From each transform set 842, one transform type is selected and applied, as described with reference to FIG. 11. The intermediate transform coefficients 328 are passed to a secondary transform module 330.

The secondary transform module 330 operates on a subset of the intermediate transform coefficients 328, such as the intermediate transform coefficients occupying the upper left 4×4 or 8×8 area of the overall block. Other transform coefficients in the intermediate transform coefficients 328 are passed through the module 330 unchanged. The secondary transform module 330 applies one of a variety of transforms on the subset of the intermediate transform coefficients 328 to produce transform coefficients represented by an arrow 332. The secondary transform module 330 applies a forward secondary transform selected in a manner analogous to that of an inverse secondary transform module 344. The transforms available to the secondary transform module 330 are typically non-separable and thus cannot be performed in two stages (i.e. rows and columns) as is the case for the transform module 326. Due to the higher complexity of the secondary transform, and the earlier decorrelation of the primary transform, it is sufficient to perform the secondary transform just on the top-left region of the transform block. The transform performed by the secondary transform module 330 may be selected dependent, at least in part, on the prediction mode. Additionally, the video encoder 114 may consider the selection of the applied transform at the module 330 as a test of further candidates for selection based on rate/distortion cost evaluation.

The transform coefficients 332 are passed to a quantiser module 334. At the module 334, quantisation in accordance with a 'quantisation parameter' is performed to produce residual coefficients, represented by the arrow 336. The quantisation parameter is constant for a given transform block and thus results in a uniform scaling for the production of residual coefficients for a transform block. A non-uniform scaling is also possible by application of a 'quantisation matrix', whereby the scaling factor applied for each residual coefficient is derived from a combination of the quantisation parameter and the corresponding entry in a scaling matrix, typically having a size equal to that of the transform block. The quantisation matrix is costly to signal thus is coded only infrequently (if at all) in the bitstream 115. Coding of the quantisation matrix requires converting the two dimensional matrix of scaling factors into a list of scaling factors to be entropy encoded into the bitstream 115. The existing Z-order scan may be reused for this purpose, avoiding the overhead associated with supporting an additional scan pattern for the infrequently performed operation of encoding a quantisation matrix. The residual coefficients 336 are supplied to an entropy encoder 338 for encoding in the bitstream 115. Typically, the residual coefficients of a transform block are scanned to produce an ordered list of values, according to a scan pattern. The scan pattern generally scans the transform block as a sequence of 4×4 'sub-blocks', providing a regular scanning operation at the granularity of 4×4 sets of residual coefficients, with the arrangement of sub-blocks dependent on the size of the transform block. Additionally, the prediction mode and the corresponding block partitioning are also encoded in the bitstream 115. As described above, the video encoder 114 needs access to a frame representation corresponding to the frame representation seen in the video decoder 134. Thus, the residual coefficients 336 are also inverse quantised by a dequantiser module 340 to produce inverse transform coefficients, represented by an arrow 342. The inverse transform coefficients 342 are passed through an inverse secondary transform module 344. The inverse secondary transform module 344 applies the selected secondary transform to produce intermediate inverse transform coefficients, as represented by an arrow 346. The intermediate inverse transform coefficients 346 are supplied to an inverse transform module 348 to produce residual samples, represented by an arrow 350, of the transform unit. A summation module 352 adds the residual samples 350 and the PU 320 to produce reconstructed samples (indicated by an arrow 354) of the CU. The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame prediction blocks for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366. For each candidate intra prediction mode the intra-frame prediction module 364 produces a block of samples, i.e. 366.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is the 'adaptive loop filter' (ALF), which applies a Wiener-based adaptive filter to further reduce distortion. A further available filtering stage in the in-loop filters module 368 is the 'sample adaptive offset' (SAO) filter. The SAO filter operates by firstly classifying reconstructed samples into one or multiple categories and, according to the allocated category, applying an offset at the sample level. Filtered samples 370 are output from the in-loop filters module 368. The filtered samples 370 are stored in a frame buffer 372. The frame buffer 372 typically has the capacity to store several (e.g. up to 16) pictures and thus is stored the memory 206. As such, access to the frame buffer 372 is costly in terms of memory bandwidth. The frame buffer 372 provides reference frames (represented by an arrow 374) to a motion estimation module 376 and a motion compensation module 380.

The motion estimation module 376 estimates a number of 'motion vectors' (indicated as 378), each being a Cartesian spatial offset from the location of the present CU, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block (uni-predicted') or may be formed using two reference blocks (bi-predicted'). For the selected motion vector, the motion compensation module 380 produces the PU 320 in accordance with a filtering process supportive of sub-pixel accuracy in the motion vectors. As such, the motion estimation module 376 (which operates on many candidate motion vectors) may conceivably perform a simplified filtering process compared to that of the motion compensation module 380 (which operates on the selected candidate only) to achieve reduced computational complexity.

Although the video encoder 114 of FIG. 3 is described with reference to versatile video coding (VVC), other video coding standards or implementations may also employ the processing stages of modules 310-386. The frame data 113 (and bitstream 115) may also be read from (or written to) memory 206, the hard disk drive 210, a CD-ROM, a Blu-ray disk™ or other computer readable storage medium. Additionally, the frame data 113 (and bitstream 115) may be received from (or transmitted to) an external source, such as a server connected to the communications network 220 or a radio-frequency receiver.

The video decoder 134 is shown in FIG. 4. Although the video decoder 134 of FIG. 4 is an example of a versatile video coding (VVC) video encoding pipeline, other video codecs may also be used to perform the processing stages described herein. As seen in FIG. 4, the bitstream 133 is input to the video decoder 134. The bitstream 133 may be read from memory 206, the hard disk drive 210, a CD-ROM, a Blu-ray disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 and passes the values of the syntax elements to other modules in the video decoder 134. The entropy decoder module 420 applies a CABAC algorithm to decode syntax elements from the bitstream 133. The decoded syntax elements are used to reconstruct parameters within the video decoder 134. Parameters include residual coefficients (represented by an arrow 424) and mode selection information such as an intra prediction mode 458 and an explicit multiple transform index 454. The mode selection information also includes information such as motion vectors, and the partitioning of each CTU into one or more CUs. Parameters are used to generate PUs, typically in combination with sample data from previously decoded CUs.

Figure 10A:
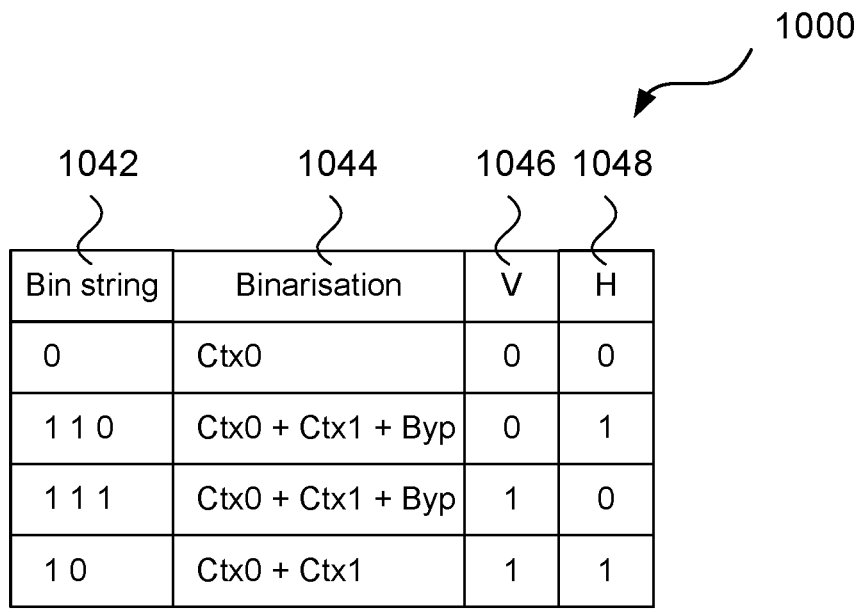
FIG. 10A is a diagram showing a relationship between a truncated unary syntax element and transform indices for transform indexing horizontally and vertically.

The bitstream 133 also contains a bin string from the bin string column 1042 (see FIG. 10A). The entropy decoder module 420 extracts the bin string and produces a vertical transform set index (from a vertical transform set index column 1046) and a horizontal transform set index (from a horizontal transform set index column 1048).

The residual coefficients 424 are input to a dequantiser module 428. The dequantiser module 428 performs inverse scaling on the residual coefficients 424 to create reconstructed intermediate transform coefficients (represented by an arrow 432) according to a quantisation parameter. Should use of a non-uniform inverse quantisation matrix be indicated in the bitstream 133, the video decoder 134 reads a quantisation matrix from the bitstream 133 as a sequence of scaling factors and arranges the scaling factors into a matrix according to the Z-order scan used for coding of residual coefficients. Then, the inverse scaling uses the quantisation matrix in combination with the quantisation parameter to create the reconstructed intermediate transform coefficients. Use of the Z-order scan for residual coefficients to also scan quantisation matrix scaling factors avoids the presence of an additional scan pattern and associated memory and complexity burden for a scan that is infrequently performed. The reconstructed intermediate transform coefficients 432 are passed to an inverse secondary transform module 436. The inverse secondary module 436 performs a 'secondary inverse transform' to produce reconstructed transform coefficients, represented by an arrow 440. The secondary transform is performed according to a determined transform block size. The reconstructed transform coefficients 440 are passed to an inverse transform module 444, as described with reference to FIG. 9. The module 444 transforms the coefficients from the frequency domain back to the spatial domain. The transform block is effectively based on significant residual coefficients and non-significant residual coefficient values. The result of operation of the module 444 is a block of residual samples, represented by an arrow 448. The residual samples 448 are equal in size to the corresponding CU. The residual samples 448 are supplied to a summation module 450. At the summation module 450 the residual samples 448 are added to a decoded PU 452 to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

A reconstructed sample cache 460 operates similarly to the reconstructed sample cache 356 of the video encoder 114. The reconstructed sample cache 460 provides storage for reconstructed sample needed to intra predict subsequent CUs without the memory 206 (e.g., by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with an intra prediction mode parameter 458 signalled in the bitstream 133 and decoded by the entropy decoder 420.

When intra prediction is indicated in the bitstream 133 for the current CU, the intra-predicted samples 480 form the decoded PU 452 via a multiplexor module 484.

When inter prediction is indicated in the bitstream 133 for the current CU, a motion compensation module 434 produces a block of inter-predicted samples 438 using a motion vector and reference frame index to select and filter a block of samples from a frame buffer 496. The block of samples 498 is obtained from a previously decoded frame stored in the frame buffer 496. For bi-prediction, two blocks of samples are produced and blended together to produce samples for the decoded PU 452. The frame buffer 496 is populated with filtered block data 492 from an in-loop filtering module 488. As with the in-loop filtering module 368 of the video encoder 114, the in-loop filtering module 488 applies any, at least, or all of the DBF, the ALF and SAO filtering operations. The in-loop filtering module 368 produces the filtered block data 492 from the reconstructed samples 456.

Figure 5:
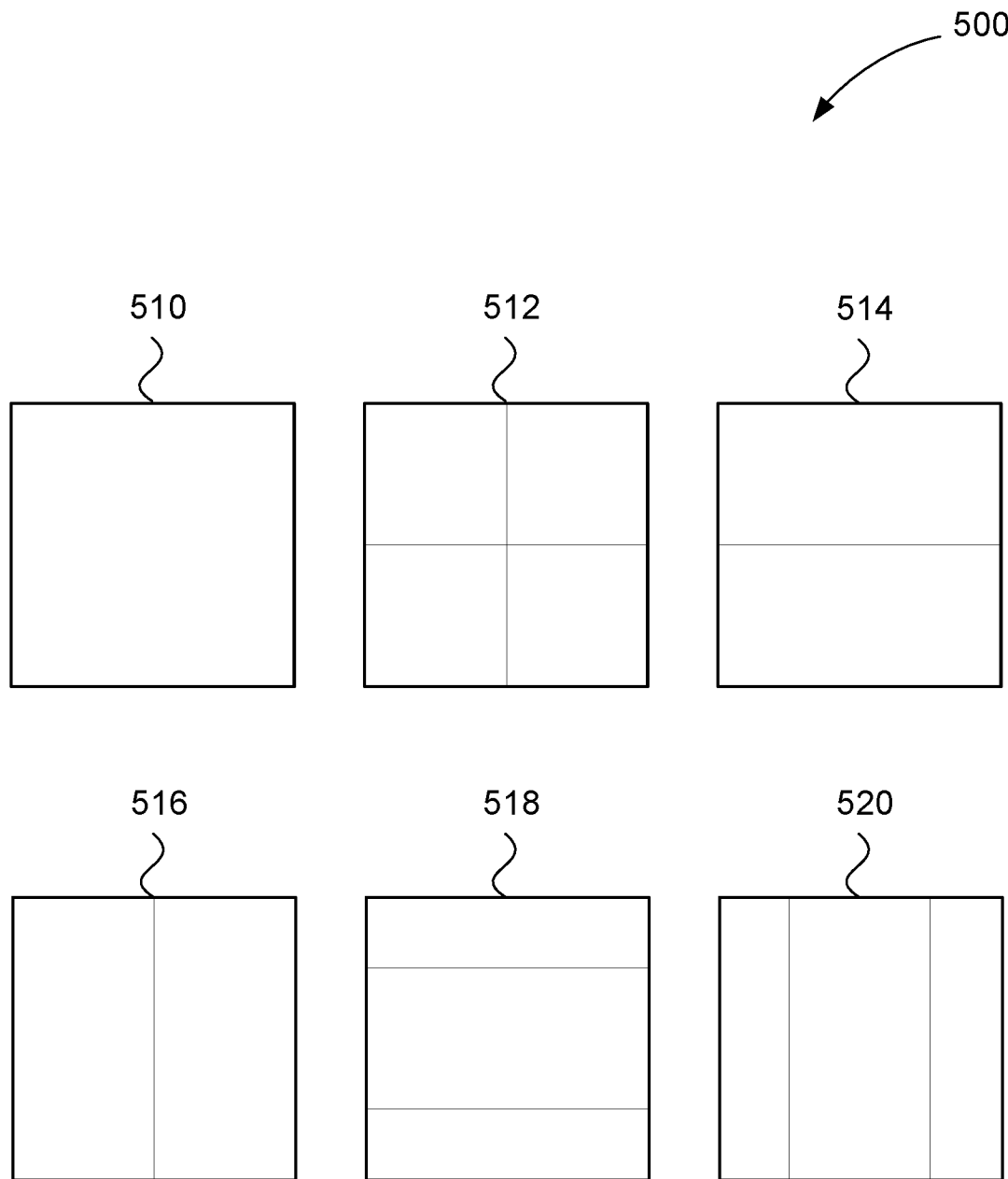
FIG. 5 is a schematic block diagram showing the available divisions of a block into one or more blocks in the tree structure of versatile video coding.

FIG. 5 is a schematic block diagram showing a collection 500 of available divisions or splits of a block into one or more blocks in the tree structure of versatile video coding. The divisions shown in the collection 500 are available to the block partitioner 310 of the encoder 114 to divide each CTU into one or more CUs according to the Lagrangian optimisation, as described with reference to FIG. 3.

Although the collection 500 shows only square blocks being divided into other, possibly non-square blocks, it should be understood that the diagram 500 is showing the potential divisions but not constraining the containing block to be square. If the containing block is non-square, the dimensions of the blocks resulting from the division are scaled according to the aspect ratio of the containing block. The particular subdivision of a CTU into one or more CUs by the block partitioner 310 is referred to as the 'coding tree' of the CTU. In the context of the present disclosure, a leaf node is a node at which the process of subdivision terminates. The process of subdivision must terminate when the region corresponding to the leaf node is equal to a minimum coding unit size. Leaf nodes resulting in coding units of the minimum size exist at the deepest level of decomposition of the coding tree. The process of subdivision may also terminate prior to the deepest level of decomposition, resulting in coding units larger than the minimum coding unit size.

At the leaf nodes of the coding tree exist CUs, with no further subdivision. For example, a leaf node 510 contains one CU. At the non-leaf nodes of the coding tree exist either a split into two or more further nodes, each of which could either contain one CU or contain further splits into smaller regions.

A quad-tree split 512 divides the containing region into four equal-size regions as shown in FIG. 5. Compared to HEVC, versatile video coding achieves additional flexibility with the addition of a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with the addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT' or alternatively as a multi-tree (MT).

Compared to HEVC, which supports only the quad tree and thus only supports square blocks, the QTBTTT results in many more possible CU sizes, especially considering possible recursive application of binary tree and/or ternary tree splits. The potential for unusual (for example, non-square) block sizes may be reduced by constraining split options to eliminate splits that would result in a block width or height either being less than four samples or in not being a multiple of four samples. Generally, the constraint would apply in considering luma samples. However, the constraint may also apply separately to the blocks for the chroma channels, potentially resulting in differing minimum block sizes for luma versus chroma, for example when the frame data is in the 4:2:0 chroma format.

Figure 6:
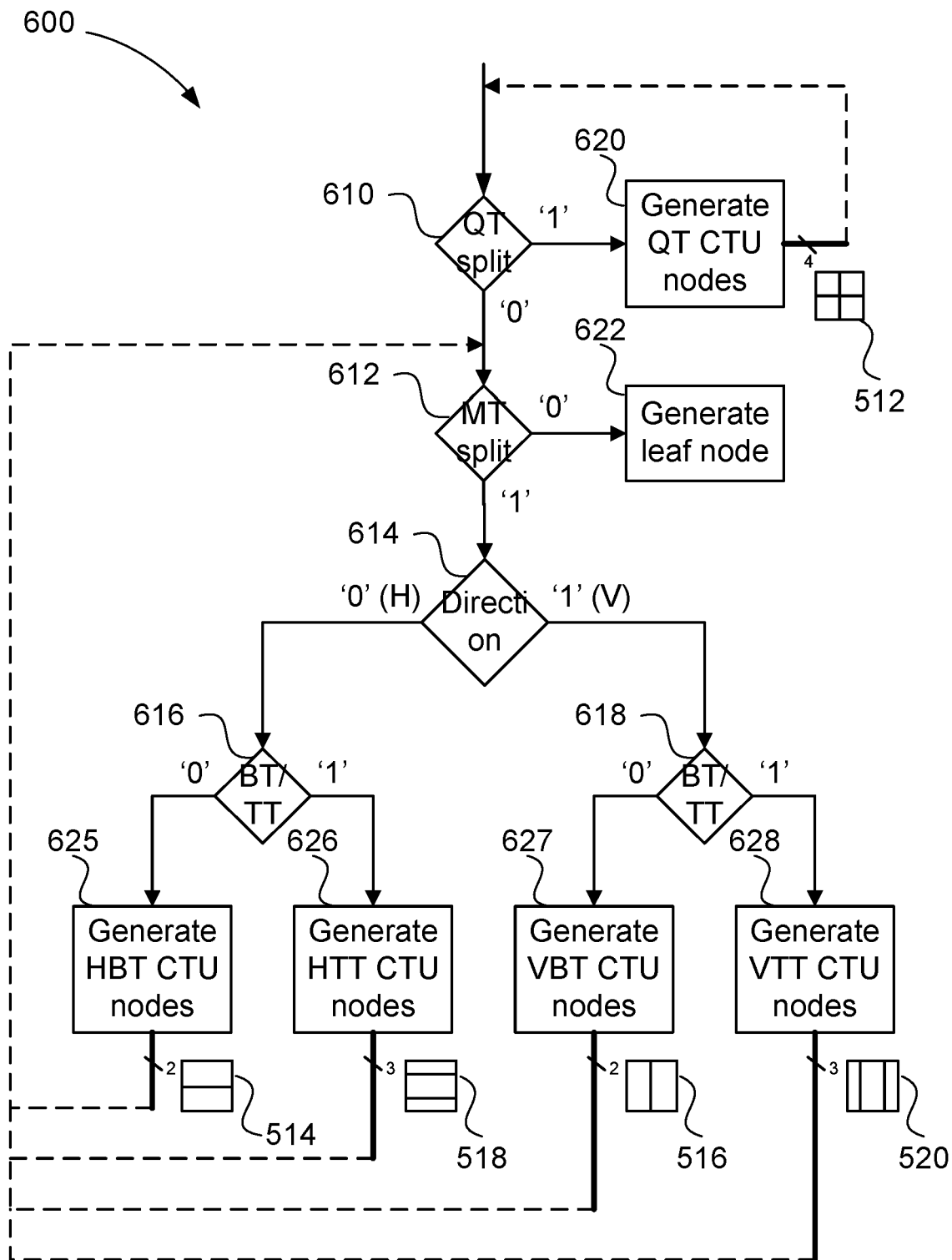
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a coding unit (CU). The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

Figure 7A:
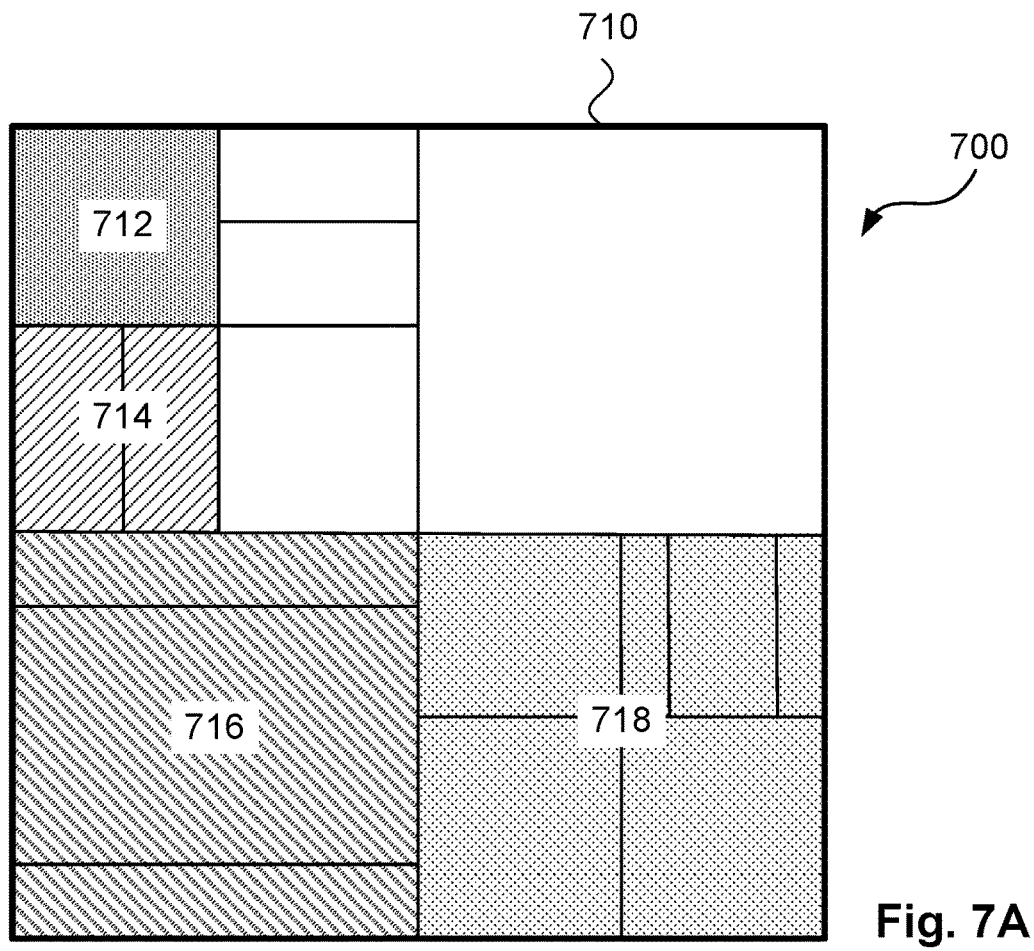
FIG. 7 is an example division of a coding tree unit (CTU) into a number of coding units (CUs)
Figure 7B:
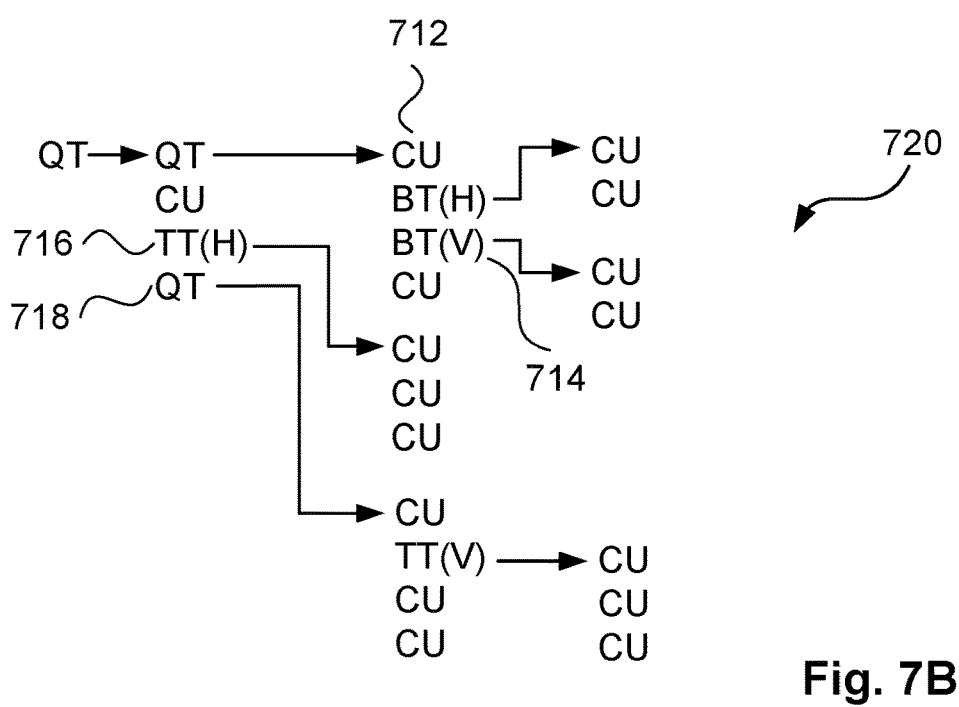

FIGS. 7A and 7B provide an example division 700 of a CTU 710 into a number of coding units (CUs). An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top to bottom and left to right scan, respectively. The coding tree 720 of FIG. 7B lists all nodes and CUs according to the applied scan order. Each split generates a list of 2, 3 or 4 new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation and quantisation by the encoder 114. The resulting transform blocks (TBs) 336 are subsequently scanned to form a sequential list of residual coefficients, as part of the operation of the entropy coding module 338. An equivalent process is performed in the video decoder 134 to obtain transform blocks from the bitstream 133.

Figure 8A:
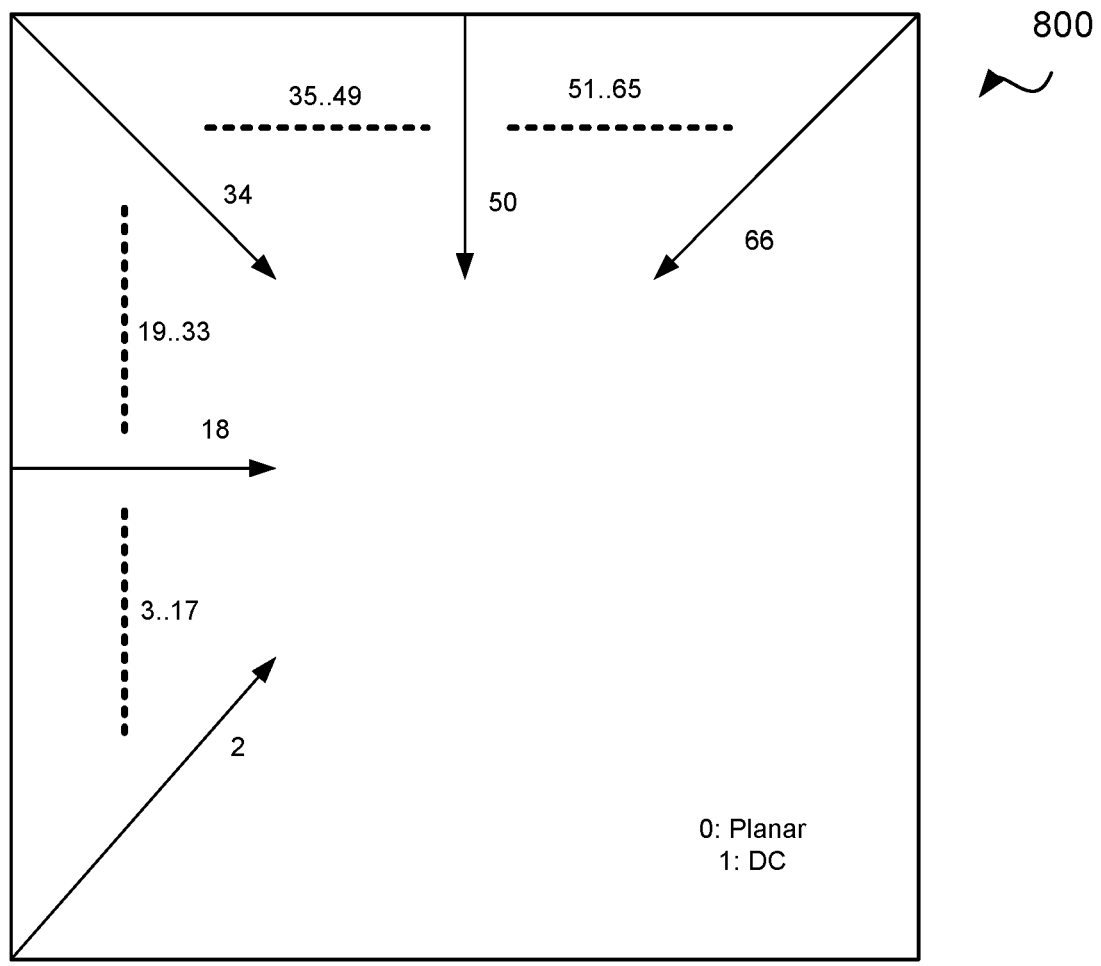
FIG. 8A is a diagram showing intra prediction modes.

FIG. 8A shows a set 800 of intra prediction modes for a transform block that can be indicated using the intra prediction modes 388 and 458. In FIG. 8A, 67 intra prediction modes are defined. Mode 0 is a 'planar' intra prediction mode, mode 1 is a 'DC' intra prediction mode and modes 2-66 are 'angular' intra prediction modes. The planar intra prediction mode (mode 0) populates a prediction block with samples according to a plane, i.e. having an offset and a gradient horizontally and vertically. The plane parameters are obtained from neighbouring reference samples, where available. Likewise, the DC intra prediction mode (mode 1) populates the prediction block with an offset, also using neighbouring reference samples (where available).

The angular intra prediction modes (modes 2-66) populate the block by producing a texture aligned to one of 65 directions, or 'angles'. For clarity, a subset of the 65 angles are shown in FIG. 8A, being modes 2, 18, 34, 50, and 66. For each mode, neighbouring reference samples are used to produce a texture that populates the prediction block in the direction indicated by the arrow for the angular intra prediction mode. Additional angles, not explicitly shown in FIG. 8A, are at intermediate positions (i.e. modes 3-17, 19-33, 35-49, and 51-65). A first symmetry is evident from FIG. 8A along angular mode 34 and in a diagonal direction from the top-left to the bottom right of the prediction block. From the first symmetry, modes 2 to 34 are shown to correspond to modes 66 down to 34, with a transposition along this diagonal axis.

Figure 8B:
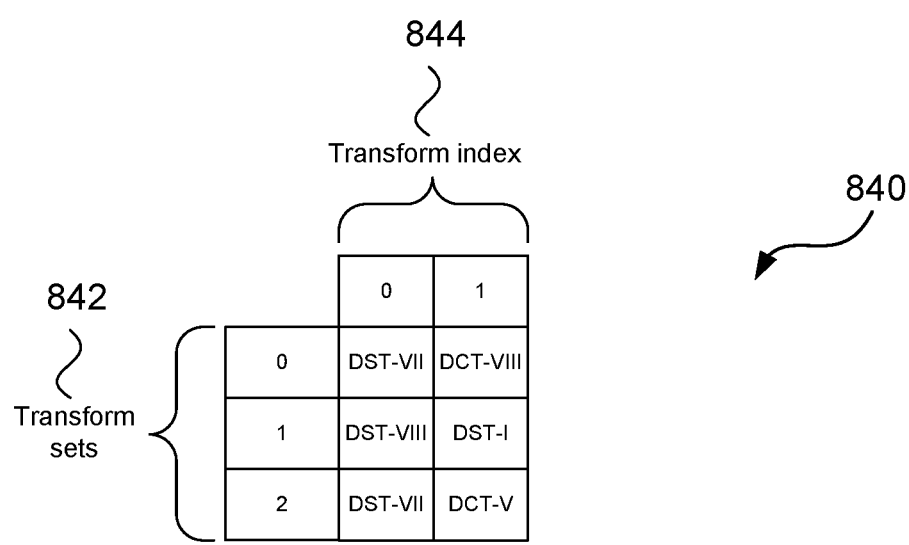
FIG. 8B is a table showing a mapping from a transform set to a particular transform according to a transform index.

FIG. 8B shows a mapping 840 from each of transform sets 842 to a particular transform type according to a transform index 844. Three transform sets 842 are defined and identified by respective transform set indices of zero, one, and two. Each transform set 842 includes two transform types, which are selectable by the transform index 844. As a result, the mapping 840 allows a given transform type to be selected based on the transform set index of the transform sets 842 and the transform index 844. The selected transform is a one dimensional transform. A separate selection of the transform type is performed for the horizontal and vertical directions. The size of the transform (number of points) corresponds to the dimension of the transform block. That is, the size of the transform corresponds to the height of the transform block when selecting a vertical transform, while the size of the transform corresponds to the width of the transform block when selecting a horizontal transform.

FIG. 8C is a table showing a mapping 880 from intra prediction modes to a transform set index of the transform sets 842 for a transform block based on whether the transform block is in a horizontal direction ("H") or a vertical direction ("V"). For each intra prediction mode, one of the transform set indices associated with the three transform sets 842 is selected for the horizontal direction H and one of the transform set indices associated with the three transform sets 842 is selected for the vertical direction V.

For example, an intra prediction mode 14 is mapped to the transform set index 0 for a transform block in the vertical direction, while the intra prediction mode 14 is mapped to the transform set index 2 for a transform block in the horizontal direction. As shown in the mapping 840 in FIG. 8B, the transform set index 0 is mapped to either DST-VII or DCT-VIII, which is selectable depending on the transform index 844. Also shown in the mapping 840 in FIG. 8B, the transform set index 2 is mapped to either DST-VII or DCT-V, which is selectable depending on the transform index 844. Accordingly, for a transform block in the vertical direction, the intra-prediction mode 14 uses either DST-VII or DCT-VIII transform depending on the transform index 844. Accordingly, for a transform block in the horizontal direction, the intra-prediction mode 14 uses either DST-VII or DCT-V transform depending on the transform index 844. The transform index 844 is based on the explicit multiple transform index 390 or 454. As described above, the explicit multiple transform index 390 is selected by the mode selector 306 and the explicit multiple transform index 454 is derived by the entropy encoder 420 from the bitstream 133.

Figure 9:
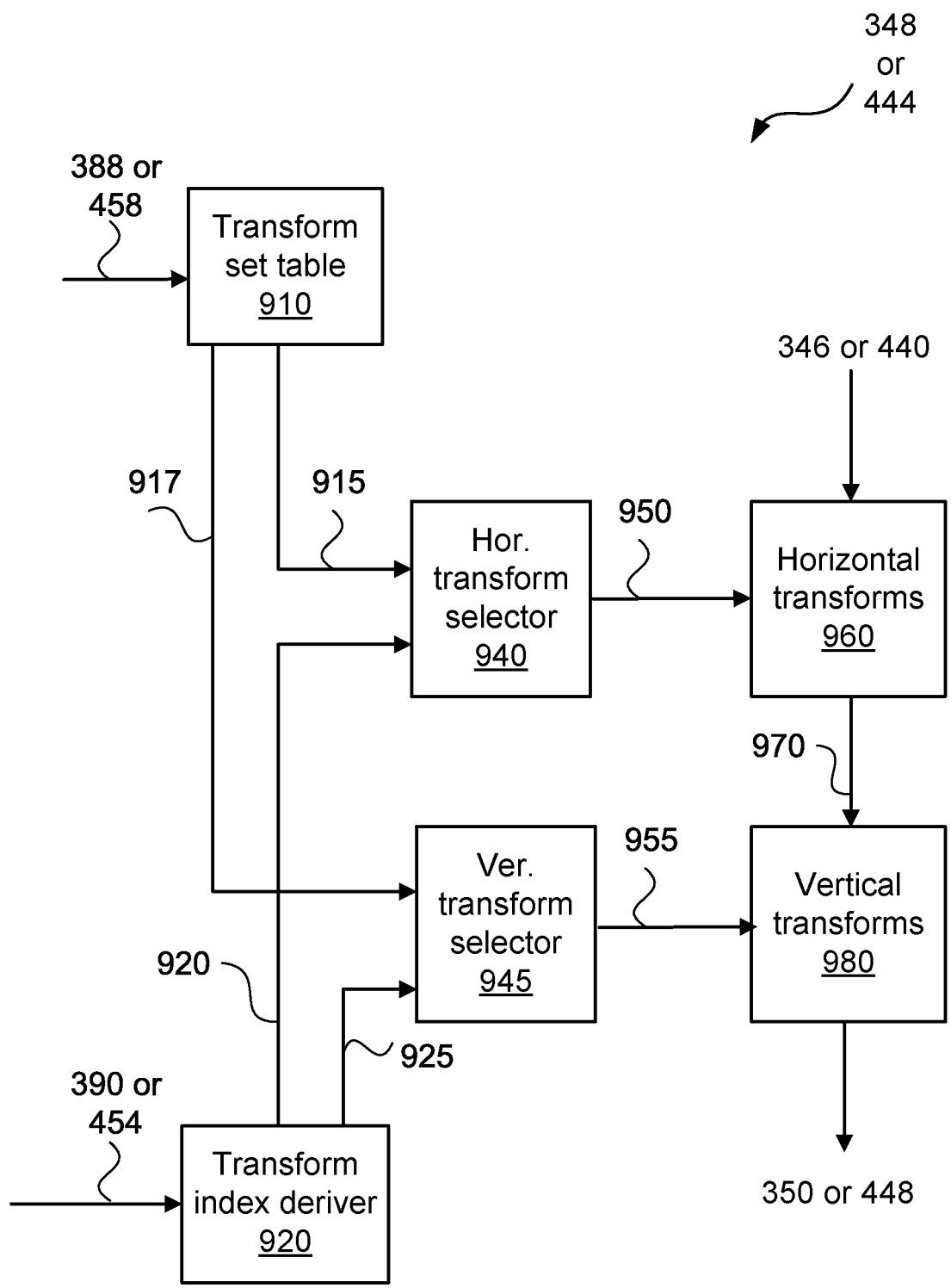
FIG. 9 is a schematic block diagram showing the inverse transform module of the video encoder of FIG. 3 or the video decoder of FIG. 4.

FIG. 9 is a schematic block diagram showing the inverse transform module 348 of the video encoder 114 or the inverse transform module 444 of the video decoder 134. The operations of both modules 348 and 444 are identical, reflecting the need for the video encoder 114 to model the inverse quantisation and inverse transformation of residual coefficients performed in the video decoder 134.

Each of the inverse transform modules 348 and 444 includes a transform set table module 910, a transform index deriver module 920, a horizontal transform selector module 940, a vertical transform selector module 945, a horizontal transforms module 960, and a vertical transforms module 980.

The transform set table module 910 receives the intra prediction mode 388 or 458. When implemented as the inverse transform module 348, the transform set table module 910 receives the intra prediction mode 388 from the mode selector 386 (see FIG. 3). When implemented as the inverse transform module 444, the transform set table module 910 receives the intra prediction mode 458 from the entropy encoder 420 (see FIG. 4).

The transform set table module 910 determines a horizontal transform set index (represented as an arrow 915) and a vertical transform set index (represented as an arrow 917) from the intra prediction mode 388 or 458. The horizontal transform set index 915 and the vertical transform set index 917 are determined according to the mapping 880 (see FIG. 8C).

The transform index deriver 920 receives the explicit multiple transform index 390 or 454. When implemented as the inverse transform module 348, the transform index deriver 920 receives the explicit multiple transform index 390 from the mode selector 386 (see FIG. 3). When implemented as the inverse transform module 444, the transform index deriver 920 receives the explicit multiple transform index 454 from the entropy encoder 420 (see FIG. 4).

The transform index deriver 920 extracts a horizontal transform index 920 and a vertical transform index 925 from the explicit multiple transform index 390 or 454. The horizontal transform index 920 and the vertical transform index 925 are each in a range of zero to one.

The horizontal transform selector module 940 receives the horizontal transform set index 915 (from the transform set table module 910) and the horizontal transform index 920 (from the transform index deriver 920). The horizontal transform selector 940 produces a selected horizontal transform (represented as an arrow 950) from the horizontal transform set index 915 and the horizontal transform index 920 according to the mapping 840 (see FIG. 8B). The horizontal transform set index 915 is used to select one of the transform sets 842 and the horizontal transform index 920 is used to select one of the transform index 844.

The vertical transform selector module 945 receives the vertical transform set index 917 (from the transform set table module 910) and the vertical transform index 925 (from the transform index deriver 920). The vertical transform selector module 945 produces a selected vertical transform 955 from the vertical transform set index 917 and the vertical transform index 925 according to the mapping 840 (see FIG. 8B). The vertical transform set index 917 is used to select one of the transform sets 842 and the vertical transform index 925 is used to select one of the transform index 844.

The horizontal transforms module 960 applies the selected horizontal transform 950 to the intermediate inverse transform coefficients 346 or the reconstructed transform coefficients 440. The intermediate inverse transform coefficients 346 is from the inverse secondary transform module 344 (see FIG. 3). The reconstructed transform coefficients 440 is from the inverse secondary transform module 436 (see FIG. 4).

The transform coefficients 346 or 440 are transformed according to the selected horizontal transform 950. That is, the selected horizontal transform 950 having a set of one dimensional transforms is applied to each row of the array of transform coefficients 346 or 440. Each one dimensional transform spans the width of the transform block. The horizontal transforms module 960 outputs horizontally transformed transform coefficients 970 as an array having equal size as the current transform block. The transform coefficients 970 are supplied to a vertical transform module 980. For ease of description, the transform coefficients 970 refer to both the horizontally transformed transform coefficients 346 and 440.

The vertical transform module 980 applies the selected vertical transforms 955 having a set of one dimensional transforms to each column of the horizontally transformed transform coefficients 970. The vertical transform module 980 uses the vertical selected transform 955 to produce residual samples 350 or 448 from the respective horizontally transformed transform coefficients 346 or 440.

FIG. 10A shows a table 1000 showing a relationship between a truncated unary syntax element and transform indices for transform selection. The transform indices are the horizontal transform index H (shown in column 1048) and the vertical transform index V (shown in column 1046). The table 1000 includes a bin string column 1042, a binarisation column 1044, a vertical transform index column 1046, and a horizontal transform index column 1048.

The bin string column 1042 has four possible bin strings, which are from a truncated unary binarisation with a maximum value of three (i.e., a range from zero to three). For the encoder 114, the bin strings shown in column 1042 are the bin strings that the entropy encoder 338 encodes into the bitstream 115. The bin string to be encoded into the bitstream 115 is selected based on the horizontal transform index H and the vertical transform index V that have been selected by the mode selector 386.

For the decoder 134, the bin strings shown in column 1042 are the bin strings that are decoded by the entropy decoder 420 from the bitstream 133. The entropy decoder 420 then outputs the horizontal transform index H and the vertical transform index V based on the decoded bin string.

The binarisation column 1044 includes the composition for each bin string in the bin string column 1042. In this nomenclature, "Ctx0" and "Ctx1" refer to two distinct CABAC contents that are used to code the corresponding bins in the bin string column 1042. The term "Byp" refers to a bypass coded bin used to code the corresponding bin in the bin string column 1042.

The vertical transform index column 1046 contains the index value (which is either zero or one) for selecting a transform from the transform set for the vertical 1D transforms. In the horizontal transform index column 1048 contains the index value (which is either zero or one) for selecting a transform from the transform set for the horizontal 1D transforms. In the table 1000, the shortest bin string is assigned to the case of vertical and horizontal indices of "0" and "0". The shortest bin string corresponds to the most frequently selected case by the mode selector 386. Then, the second shortest bin string is assigned to the case of vertical and horizontal indices of "1" and "1". This corresponds to the second most frequently selected case by the mode selector 386. Then, the cases of index value combination of "01" or "10" for the combination of vertical transform index and the horizontal transform index are equally improbable and are assigned the longest bin strings in the column 1044. Moreover, distinction between the two cases is performed using a bypass-coded bin, reflective of the approximately equal probability of occurrence between these two selections by the mode selector 386. The described statistical properties were found to be largely invariant of the transform size and thus the presence of these contexts, being selected according to their position in the truncated unary bin string, is adequate to capture the asymmetric probability distribution of bin value.

Figure 10B:
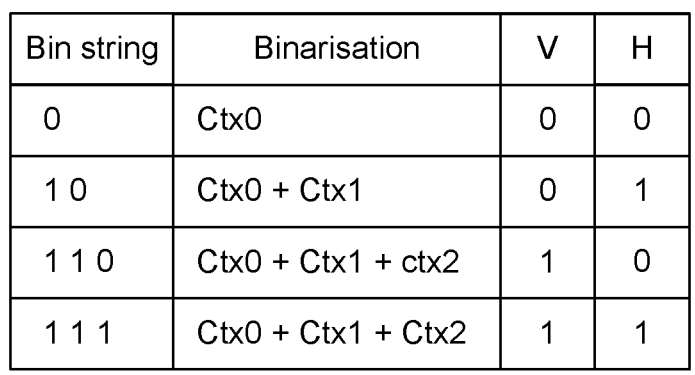
FIG. 10B is a diagram showing an alternative relationship between a truncated unary syntax element and transform indices for transform indexing horizontally and vertically.

FIG. 10B is a table 1050 showing an alternative relationship between a truncated unary syntax element and transform indices for the horizontal and vertical transform indexing, with the third bin of the truncated unary binarisation using a context coding rather than bypass coding.

Figure 11:
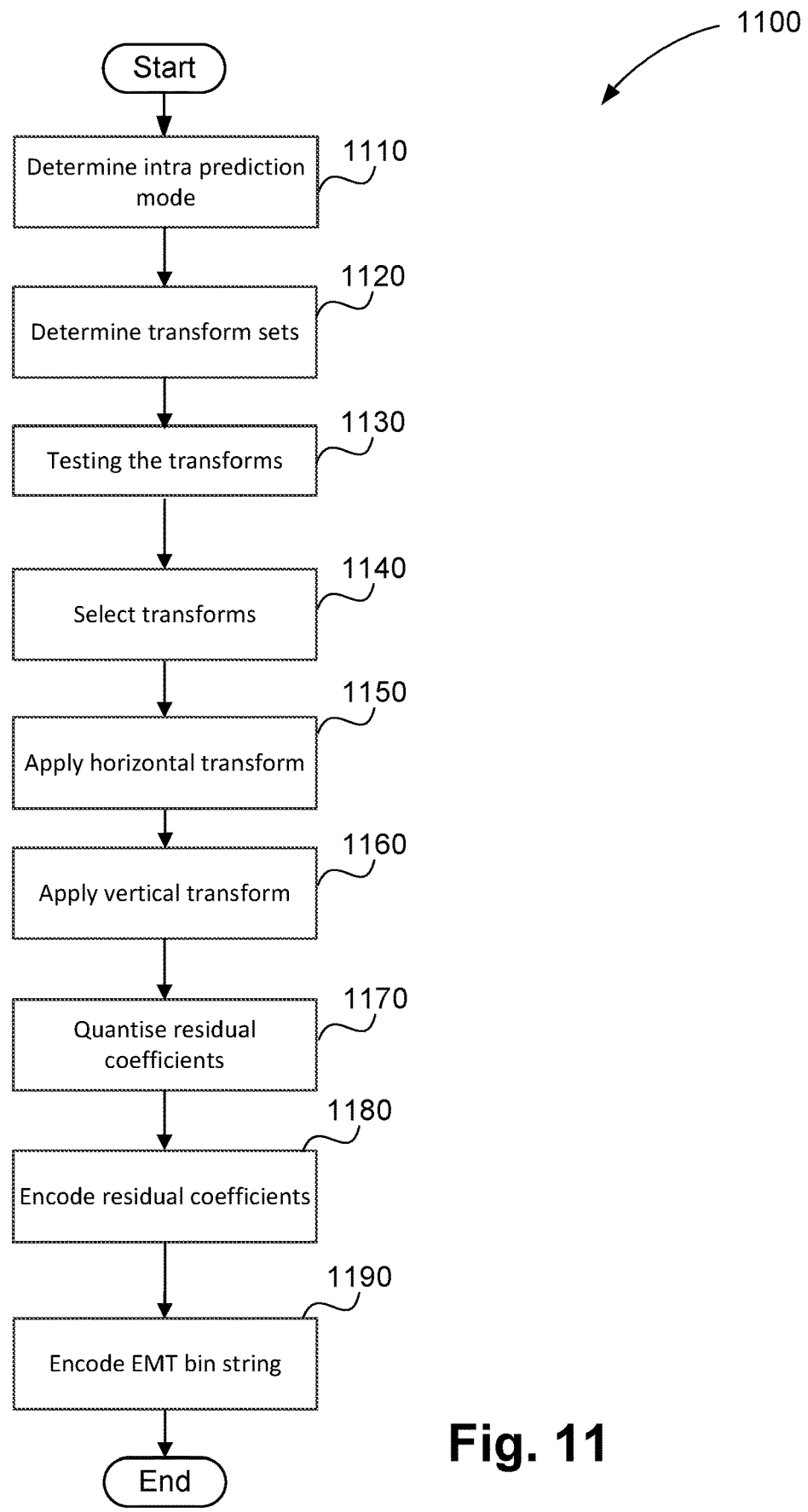
FIG. 11 is a flow chart diagram of a method of performing a primary transform according to an explicit transform selection to encode a transform block of residual coefficients into a bitstream.

FIG. 11 is a flow chart diagram of a method 1100 for performing a primary transform according to an explicit transform selection to encode a transform block of residual coefficients into the bitstream 115. The method 1100 may be embodied by apparatus such as a configured FPGA, an ASIC, or an ASSP. Additionally, the method 1100 may be performed by video encoder 114 under execution of the processor 205. As such, the method 1100 may be stored on computer-readable storage medium and/or in the memory 206. The method 1100 commences with the processor 205 at a determine intra prediction mode step 1110.

The method 1100 commences at the intra prediction mode step 1110. At the intra prediction mode step 1110, the mode selector 386, under execution of the processor 205, selects an intra prediction mode 388 for the prediction unit associated with the current coding unit. The selection generally is performed in two passes. In a first pass, all intra prediction modes for the luma prediction block are tested. For each mode, the residual cost is approximated, for example using a 'sum of absolute transformed differences' method, such as a Hadamard transform. From this test, a list of 'best' (lowest distortion) candidate prediction modes is derived. Then, a full test of the residual coding is performed on the list of candidate prediction modes. As a result of the full test, one intra prediction mode 388 is selected for the current coding unit. The intra prediction mode 388 is encoded into the bitstream 115 by the entropy encoder 338. Control in the processor 205 then progresses from the intra prediction mode step 1110 to a determine transform set step 1120.

At the determine transforms set step 1120, the inverse transform module 348, under execution of the processor 205, uses the determined intra prediction mode 388 to determine the horizontal transform set index 915 (as described above in relation to FIG. 9) and the vertical transform set index 917 (as described above in relation to FIG. 9) in accordance with the mapping 880 (see FIG. 8C). From the horizontal transform set index 915, a set of transforms is determined for the horizontal transform in accordance with the mapping 840. From the vertical transform set index 917, a set of transforms is determined for the vertical transform in accordance with the mapping 840.

As described in an example above, if the intra prediction mode 388 is mode 14, then the possible transforms for the vertical transform are DST-VII or DCT-VIII and the possible transforms for the horizontal transform are DST-VII or DCT-V.

Control in the processor 205 then progresses from the determine transforms set step 1120 to a testing the transforms step 1130.

At the testing the transforms step 1130, the transform module 326 and the inverse transform module 348, under execution of the processor 205, test each combination of transforms from the set of transforms for the horizontal transform and the set of transforms for the vertical transform from the step 1120. In the example when the intra prediction mode 388 is mode 14, the transforms of DST-VII and DCT-VIII are tested for the vertical transform and the transforms of DST-VII or DCT-V are tested for the horizontal transform.

As described above, the testing is performed by the transform module 326 and the inverse transform module 348. Particular transforms in each set are referenced using the horizontal transform index 920 (for the horizontal transform) and the vertical transform index 925 (for the vertical transform). Each combination of the vertical and horizontal transforms is tested to determine the distortion for coding the residual.

During the tests, the transform module 326 and the inverse transform module 348 perform the modules' normal operations. Hence, for all inverse transform operations performed by the inverse transform module 348, the transform module 326 performs the corresponding forward transform operation. The testing process may use methods of approximation to perform the testing with reduced complexity compared to performing the full transform.

Control in the processor 205 then progresses from the testing the transform sets step 1130 to a select transform 1140.

At the select transform step 1140, the combination of the vertical and horizontal transforms resulting in the lowest distortion for coding of the residual is selected. In the example where the intra prediction mode 388 is mode 14, the combination providing the lowest distortion could be DCT-VIII for the vertical transform and DST-VII for the horizontal transform. Control in the processor 205 then progresses from the select transform step 1140 to apply horizontal transform 1150.

At the apply horizontal transforms step 1150, the inverse transform module 348 performs the horizontal transform. In particular, the horizontal transforms module 960 performs the selected horizontal transform 950. In the example where the intra prediction mode 388 is mode 14, DST-VII is used for the horizontal transform. Control in the processor 205 then progresses from the apply horizontal transform 1150 to an apply vertical transform 1160.

At the apply vertical transforms step 1160, the inverse transform module 348 performs the vertical transform. In particular, the vertical transforms module 980 performs the selected vertical transform 955. In the example where the intra prediction mode 388 is mode 14, DCT-VIII is used for the vertical transform. As a result of the apply horizontal transforms step 1150 and the apply vertical transforms step 1160, and after optional application of the secondary transform (i.e. operation of the module 330), the transform coefficients 332 are produced. Control in the processor 205 then progresses from the apply vertical transforms step 1160 to a quantise residual coefficients step 1170.

At the quantise residual coefficients step 1170, the quantiser module 334, under execution of the processor 205, quantises the transform coefficients 332 to produce residual coefficients 336 according to a quantisation parameter. Control in the processor 205 then progresses from the quantise residual coefficients step 1170 to an encode residual coefficients step 1180.

At the encode residual coefficients step 1180, the entropy encoder 338, under execution of the processor 205, encodes the residual coefficients 336 into the bitstream 115. The residual coefficients 336 for a given transform block are coded by scanning the two dimensional array of coefficients into a list. The scan generally divides the transform block into one or more sub-blocks, each of size 4×4 (although other sizes are also possible). The presence of significant coefficient in each sub-block is signalled with a "coded sub-block flag" and, if at least one significant coefficient is present, one significance flag per residual coefficient in the sub-block. Coded sub-block flags and significance flags use context coded bins. Additional indications of magnitude, such as 'greater than one flags' and 'greater than two flags' are also coded using context-coded bins. Finally, further indications of magnitude are generally encoded using Golomb Rice coding with bypass-coded bins. The cost in bits in coding the residual coefficients 336 is largely influenced by their magnitudes. As a consequence of selection of optimal EMT indices, these magnitudes are slightly reduced, leading to an improvement in compression efficiency. The binarisation of these indices performed at the step 1190 further improves compression efficiency. Control in the processor 205 then progresses from the encode residual coefficients step 1180 to an encode EMT bin string step 1190.

At the encode EMT bin string step 1190, the entropy encoder 338, under execution of the processor 205, encodes the horizontal transform index 920 and the vertical transform index 925 into the bitstream 115 using a truncated unary binarisation (maximum value three), context modelling, and mapping of bin strings to index values as described with reference to FIG. 10A. As the most frequently selected pair of indices ("0" horizontally and "0" vertically) is encoded using the shortest bin string ("0"), coding efficiency is higher than in a simple case of using one bin for each index. The second most frequently selected pair of indices ("1" horizontally and "1" vertically) is encoded using the second shortest bin string, i.e. "1 0", and the two approximately equally least likely combinations ("1" and "0", "0" and "1") are encoded using the longest bin strings ("1 1 0" and "1 1 1"). The third bin uses bypass coding, as there is no statistical asymmetry available for exploitation using context coding. The method 1100 then terminates at the conclusion of step 1190.

FIG. 12 is a flow chart diagram of a method 1200 for decoding a transform block of residual coefficients from the bitstream 133. The decoding of the method 1200 is performed by a primary inverse transform selected according to an explicit transform selection. The method 1200 may be embodied by apparatus such as a configured FPGA, an ASIC, or an ASSP. Additionally, the method 1200 may be performed by video decoder 134 under execution of the processor 205. As such, the method 1200 may be stored on computer-readable storage medium and/or in the memory 206. The method 1200 commences with the processor 205 at a decode intra prediction mode step 1210.

At the decode intra prediction mode step 1210, the entropy decoder 420, under execution of the processor 205, decodes the intra prediction mode 458 from the bitstream 133. The entropy decoder 420 produces a list of most probable modes, including modes deemed most likely to have been selected by the mode selector 386. A context-coded bin is decoded to indicate the usage of either one of the most probable modes or other modes not in the most probable mode list (the "remaining modes"). Then, further bins are decoded to identify either which most probable mode is in use or which remaining mode is in use. Control in the processor 205 then progresses from the decode intra prediction mode step 1210 to a decode residual coefficients step 1220.

At the decode residual coefficients step 1220, the entropy decoder 420, under execution of the processor 205, decodes a list of residual coefficients and assembles the residual coefficients into an array for a transform block. The assembly follows a scan pattern, which typically groups residual coefficients into 4×4 sub-blocks. The list of residual coefficients is typically scanned in a reverse direction, which is from a "last" significant residual coefficient back towards the top-left residual coefficient (the "DC" residual coefficient, although this may not correspond to a block offset for transforms not based on the cosine function). Context-coded bins are decoded to indicate the presence of significant residual coefficients in each sub-block, and, if indicated, additional context coded bins are decoded to indicate significance of each residual coefficient in the sub-block. The magnitude of each residual coefficient may be further characterised by decoding 'greater than one' or 'greater than two' flags. Finally, for residual coefficients whose magnitude is not determined by the preceding context-coded bins, the 'remaining magnitude' is decoded using Golomb-Rice coding with bypass-coded bins. As a result of this decoding, the residual coefficients 424 for a transform block are decoded from the bitstream 133. Control in the processor 205 then progresses from the decode residual coefficients step 1220 to an inverse quantise residual coefficients step 1230.

At the inverse quantise residual coefficients step 1230, the dequantiser module 428, under execution of the processor 205, produces intermediate transform coefficients 432 by scaling the residual coefficients 424 in accordance with a quantisation parameter. The intermediate transform coefficients 432 may be transformed by application of a non-separable secondary transform, generally applied only to the upper-left region of the transform block, to produce the intermediate transform coefficients 432. As a consequence of this scaling operation, the intermediate transform coefficients 432 have approximately the same magnitude as those prior to quantisation in the video encoder (i.e., the transform coefficients 332). Through optional application of an inverse non-separable secondary transform (i.e. the inverse secondary transform module 436), the reconstructed transform coefficients 440 are obtained from the intermediate transform coefficients 432. Control in the processor 205 then progresses from the inverse quantise residual coefficients step 1230 to a decode EMT bin string step 1240.

At the decode EMT bin string step 1240, the entropy decoder 420, under execution of the processor 205, decodes a truncated unary bin string from the bitstream 133. The truncated unary bin string is one of the bin strings listed in the column 1042 in FIG. 10A. As shown in FIG. 10A and described above, the unary bin string is limited to three bins in length (which is in a range from zero to three). The truncated unary bin string is from one to three bins in length, with the first bin being context coded, the second bin (if present) being context coded with a different context, and the third bin (if present) being bypass coded. This binarisation is as described with reference to FIG. 10. Control in the processor 205 then progresses from the decode EMT bin string step 1240 to a determine EMT indices step 1250.

At the determine EMT indices step 1250, the transform index deriver 920 in the video decoder 134, under execution of the processor 205, determines the horizontal transform index 920 and the vertical transform index 925, in accordance with the table 1000 in FIG. 10A. Control in the processor 205 then progresses from the determine EMT indices step 1250 to a determine transform sets step 1260.

At the determine transform sets step 1260, the inverse transform module 444, under execution of the processor 205, determines which transform set in the mapping 840 is to be used for the horizontal and vertical transform of the primary inverse transform. In particular, using the intra prediction mode 458, the transform set table 910 is used to determine a horizontal transform set 915 and a vertical transform set 917. Control in the processor 205 then progresses from the determine transform sets step 1260 to a select transforms step 1270.

At the select transforms step 1270, the inverse transform module 444, under execution of the processor 205, determines the horizontal transform 950 and the vertical transform 955. The determination of the horizontal transform 950 and the vertical transform 955 is performed by the horizontal transform selector 940 and the vertical transform selector 945 respectively. The modules take the horizontal transform set index 915, the vertical transform set index 917, the horizontal transform index 920, and the vertical transform index 925 as inputs, as shown in FIG. 9, and produce a selected horizontal transform 950 and a selected vertical transform 960, in accordance with FIG. 8B. Control in the processor 205 then progresses from the select transforms step 1270 to an apply horizontal transform step 1280.

At the apply horizontal transform step 1280, the inverse transform module 444, under execution of the processor 205, applies the selected horizontal transform 950 using the horizontal transforms module 960. The selected horizontal transform 950 is applied to each row of the reconstructed transform coefficients 440 to produce horizontally transformed transform coefficients 970. The horizontally transformed transform coefficients 970 are supplied to the vertical transforms module 980. The vertical transforms module 980 then produces the residual samples 448 by applying the selected vertical transform 955. The residual samples 950 are further used for summation with an intra predicted PU to produce reconstructed samples, as described with reference to FIG. 4. The method 1200 then terminates.

In another arrangement of the methods 1100 and 1200, the binarisation of the truncated unary bin string is modified such that only one context coded bin is used. In particular, referring to FIG. 10A, the first bin of the binarisation 1044 remains context coded whereas the second bin of the binarisation 1044 uses a bypass coded bin instead of context coding. Arrangements using only one context coded bin save on the implementation cost at the expense of a slight degradation in compression efficiency. However, arrangements using only one context coded bin are able to achieve slightly higher throughput. The higher throughput is because the CABAC process in the entropy encoder 338 and the entropy decoder 420 is able to process bypass-coded bins at a higher rate than context-coded bins, owing at least to the absence of a context state update.

As mentioned with reference to FIG. 10A, the probability of selection of the horizontal transform index H and the vertical transform index V with values of either "0" and "1" respectively; or "1" and "0" respectively are approximately equal. As such, an alternative binarisation to that shown in FIG. 10A inverts the use of the third, bypass-coded, bin. Arrangements which invert the use of the third bin have the bin string of "1 1 1" mapped to "0", "1" for the respective vertical and horizontal transform indices, and the bin string "1 1 0" mapped to "1", "0" for the respective vertical and horizontal transform indices. Due to the approximately equal probability between these two selections, equivalent compression advantage is achieved.

As a consequence of the binarisation of the explicit multiple transform selection horizontally and vertically, in particular the aspect that they are jointly coded in accordance with their anticipated probability of selection of each index value, coding efficiency is improved compared to the case where independent syntax elements are each used for the horizontal and vertical indices (e.g. one context-coded bin each).

INDUSTRIAL APPLICABILITY

The arrangements described are applicable to the computer and data processing industries and particularly for the digital signal processing for the encoding a decoding of signals such as video and image signals, achieving high compression efficiency without excessive cost in terms of memory bandwidth due to non-localised scanning of residual coefficients.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claim(s) defining the invention are as follows:

1. A method of decoding a transform block in an image from a bitstream, the method comprising:
   decoding at least a single truncated unary codeword from the bitstream;
   determining, for the transform block, a horizontal transform type by using the decoded single truncated unary codeword and a vertical transform type by using the decoded single truncated unary codeword,
   wherein the decoded single truncated unary codeword which is used for determining the horizontal transform type is same as the decoded single truncated unary codeword which is used for determining the vertical transform type, and
   wherein, by using the decoded single truncated unary codeword, different transform types are determinable for the horizontal transform type and the vertical transform type; and
   decoding the transform block in the image by applying the determined horizontal transform type and the determined vertical transform type to the transform block in the image.

2. The method according to claim 1, wherein the horizontal transform type and the vertical transform type are determined by mapping between transform sets and transform indices, wherein the transform sets and the transform indices are determined based on the decoded single truncated unary codeword.

3. The method according to claim 2, wherein one of the determined transform sets is transform set 0 comprising transform type DST-VII and DCT-VIII.

4. The method according to claim 1,
   wherein the single truncated unary codeword uses a bin string in which a plurality of bins is includable, and
   wherein a plurality of context values used for arithmetic decoding of the plurality of bins are different from each other.

5. The method according to claim 1, wherein horizontal transform of the determined horizontal transform type is performed on the transform block in the image before vertical transform of the determined vertical transform type is performed on the transform block.

6. A method of encoding a transform block in an image into a bitstream, the method comprising:
    determining a horizontal transform type for the transform block;
    determining a vertical transform type for the transform block;
    encoding the transform block in the image by applying the determined horizontal transform type and the determined vertical transform type to the transform block in the image; and
    encoding at least a single truncated unary codeword,
    wherein, in a method of decoding, the horizontal transform type is determined by using the single truncated unary code for the transform block and the vertical transform type is determined by using the single truncated unary code for the transform block,
    wherein the single truncated unary codeword which is used for determining the horizontal transform type in the method of decoding is same as the single truncated unary codeword which is used for determining the vertical transform type in the method of decoding, and
    wherein, by using the single truncated unary codeword, different transform types are determined for the horizontal transform type and the vertical transform type in the method of decoding.

7. The method according to claim 6, wherein the horizontal transform type and the vertical transform type are determined by mapping between transform sets and transform indices, wherein the transform sets and the transform indices are determined based on the single truncated unary codeword.

8. The method according to claim 7, wherein one of the determined transform sets is transform set 0 comprising transform type DST-VII and DCT-VIII.

9. The method according to claim 6,
    wherein the single truncated unary codeword uses a bin string in which a plurality of bins is includable, and
    wherein a plurality of context values for arithmetic encoding of the plurality of bins are different from each other.

10. The method according to claim 6, wherein horizontal transform of the determined horizontal transform type is performed on the transform block in the image before vertical transform of the determined vertical transform type is performed on the transform block.

11. An apparatus configured for decoding a transform block in an image from a bitstream, the apparatus comprising:
    a decoding unit configured to decode at least a single truncated unary codeword from the bitstream; and
    a determination unit configured to determine a horizontal transform type and a vertical transform type for the transform block by using the same decoded single truncated unary codeword, wherein a transform type different from the horizontal transform type can be determined by using the same decoded single truncated unary codeword as the vertical transform type, and
    wherein the decoding unit is configured to decode the transform block in the image by applying the determined horizontal transform type and the determined vertical transform type to the transform block in the image.

12. The apparatus according to claim 11,
    wherein the single truncated unary codeword uses a bin string in which a plurality of bins is includable, and
    wherein a plurality of context values used for arithmetic decoding of the plurality of bins are different from each other.

13. An apparatus configured for encoding a transform block in an image into a bitstream, the apparatus comprising:
    a determination unit configured to determine a horizontal transform type for the transform block, and to determine a vertical transform type for the transform block; and
    an encoding unit configured to encode the transform block in the image by applying the determined horizontal transform type and the determined vertical transform type to the transform block in the image,
    wherein the encoding unit is configured to encode at least a single truncated unary codeword,
    wherein, in apparatus for decoding, the horizontal transform type is determined by using the single truncated unary codeword for the transform block and the vertical transform type is determined by using the single truncated unary codeword for the transform block,
    wherein, by using the single truncated unary codeword, different transform types are determinable for the horizontal transform type and the vertical transform type in the apparatus for decoding.

14. The apparatus according to claim 13,
    wherein the single truncated unary codeword uses a bin string in which a plurality of bins is includable, and
    wherein a plurality of context values used for arithmetic encoding of the plurality of bins are different from each other.

15. A non-transitory computer readable medium comprising a computer program comprising instructions that, when the program is executed by a computer, cause the computer to execute a method of decoding a transform block in an image from a bitstream, the method comprising:
    decoding at least a single truncated unary codeword from the bitstream;
    determining, for the transform block, a horizontal transform type by using the decoded single truncated unary codeword and a vertical transform type by using the decoded single truncated unary codeword,
    wherein the decoded single truncated unary codeword which is used for determining the horizontal transform type is same as the decoded single truncated unary codeword which is used for determining the vertical transform type, and
    wherein by using the decoded single truncated unary codeword, different transform types are determinable for the horizontal transform type and the vertical transform type; and
    decoding the transform block in the image by applying the determined horizontal transform type and the determined vertical transform type to the transform block in the image.

16. A non-transitory computer readable medium comprising a computer program comprising instructions that, when the program is executed by a computer, cause the computer to carry out a method of encoding a transform block in an image into a bitstream, the method comprising:
    determining a horizontal transform type for the transform block;
    determining a vertical transform type for the transform block;
    encoding the transform block in the image by applying the determined horizontal transform type and the determined vertical transform type to the transform block in the image; and
    encoding at least a single truncated unary codeword,
    wherein, in a method of decoding, the horizontal transform type is determined by using the single truncated unary codeword for the transform block and the vertical transform type is determined by using the single truncated unary codeword for the transform block, wherein the single truncated unary codeword which is used for determining the horizontal transform type in the method of decoding is same as the single truncated unary codeword which is used for determining the vertical transform type in the method of decoding, and wherein, by using the single truncated unary codeword, different transform types are determinable for the horizontal transform type and the vertical transform type in the method of decoding.

* * * * *